(12) United States Patent
Awasthi et al.

(10) Patent No.: US 12,411,967 B1
(45) Date of Patent: Sep. 9, 2025

(54) DATA STORE ON A DEVICE AND RELATED ACCESS CONTROLS

(71) Applicant: Amazon Technologies, Inc., Seattle, WA (US)

(72) Inventors: Mansi Awasthi, Pune (IN); Russell Myers, Marietta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 17/994,959

(22) Filed: Nov. 28, 2022

(51) Int. Cl.
   *G06F 21/62* (2013.01)
   *G06F 21/45* (2013.01)

(52) U.S. Cl.
   CPC .......... *G06F 21/6218* (2013.01); *G06F 21/45* (2013.01)

(58) Field of Classification Search
   None
   See application file for complete search history.

(56) References Cited

U.S. PATENT DOCUMENTS

| 11,089,107 | B1* | 8/2021 | Chor | H04L 63/08 |
|---|---|---|---|---|
| 2019/0306171 | A1* | 10/2019 | Sisley | H04W 12/08 |
| 2021/0019062 | A1* | 1/2021 | Fessel | G06F 3/0622 |
| 2021/0157743 | A1* | 5/2021 | Chandrasekaran | G06F 12/0897 |

* cited by examiner

Primary Examiner — Nelson S. Giddins
(74) Attorney, Agent, or Firm — Kilpatrick Townsend & Stockton LLP

(57) ABSTRACT

A data store of a device and related controls are described. For example, a first application of the device sends first data to the data store. The first data permits use of the data store by a plurality of applications. The first application receives second data from a second application executing remotely from the device and, based at least in part on the first data, sends the second data to the data store. The first application also receives a read request of a third application of the device to read the second data from the data store. The first application determines a permission of the third application to access the data store based at least in part on the first data. As such, the first application sends the second data to the to the third application.

20 Claims, 21 Drawing Sheets

DATA STORE ON A DEVICE AND RELATED ACCESS CONTROLS

BACKGROUND

An application can execute on a device and can present data in a user interface of the device. The data can be updated over time by using, for example, a pull mechanism. In particular, the application can repeatedly request and receive data from a data source that is remote from the device.

BRIEF DESCRIPTION OF THE DRAWINGS

Various embodiments in accordance with the present disclosure will be described with reference to the drawings, in which.

DETAILED DESCRIPTION

Figure 1A:
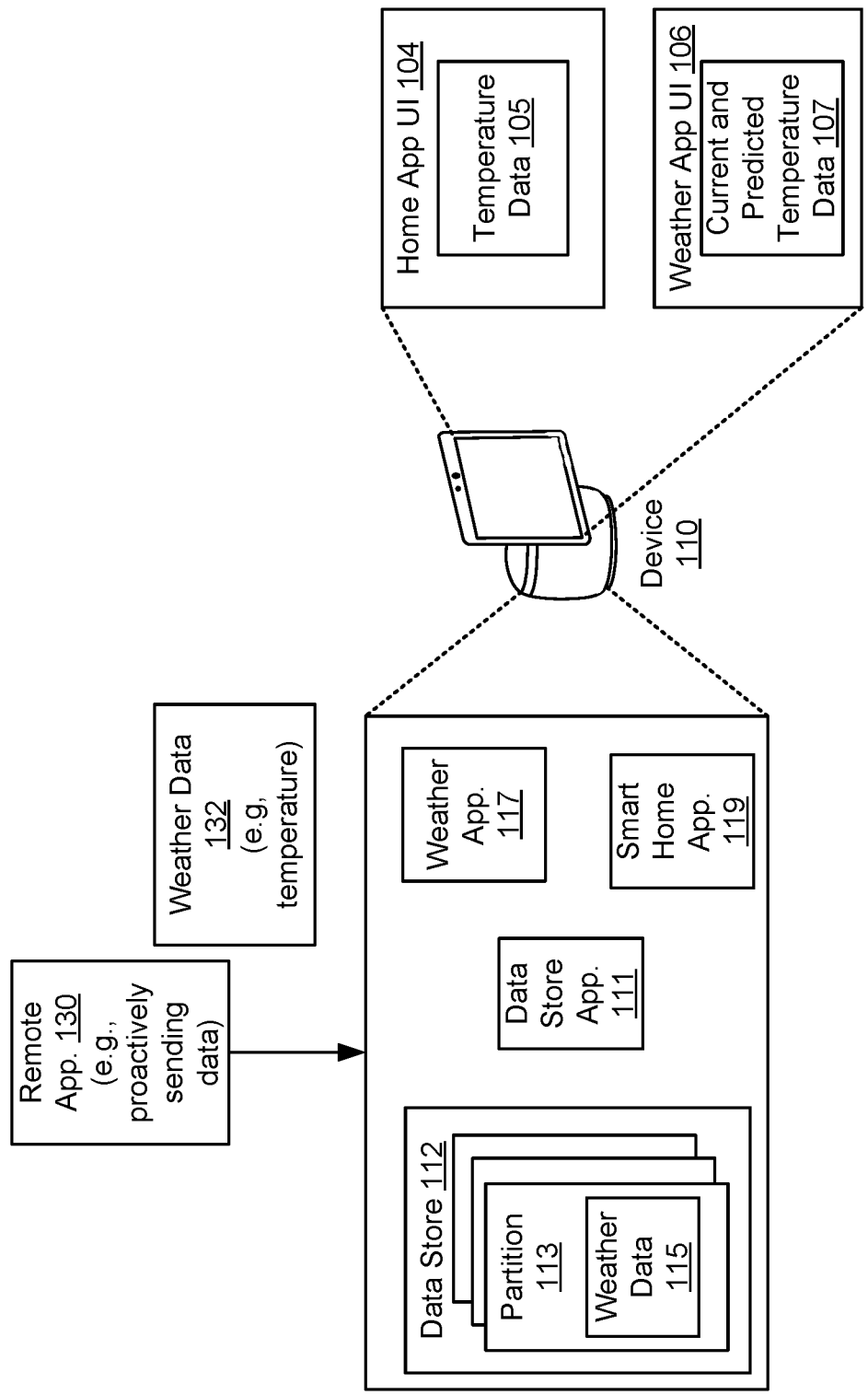
FIG. 1A illustrates an example of a device that includes a data store and a data store application that controls use of the data store by a plurality of applications, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, a data store of a device and related access controls. In an example, a first application of the device controls use of the data store by a plurality of applications, some of these applications can be executed remotely from the device and other ones can be executed locally on the device. In particular, the first application generates first data permitting a second application to write data in a partition of the data store and a third application to read the data from the partition. The second application can be executed remotely from the device, whereas the third application can be executed locally on the device. The first data can be stored in the data store, such as in the partition. The first application can receive second data from the second application, whereby the second application can request the data to be stored in the partition, and whereby the data can be received prior to a request from any of the applications executing locally on the device for the data. Based on the first data permitting data writes of the second application, the first application can cause the first data to be stored in the partition by writing the data in the partition. Subsequently, the first device can receive a request of the third application to read data stored in the partition. Based on the first data permitting data reads of the third application, the first application can read and send the second data from the partition to the third application. Additional permissions can be associated with the partition. For example, the first data can indicate that a fourth application can only read data from the partition, whereas the third application can delete data stored in the partition. As such, upon a read request of the fourth application identifying the partition, the first application can send the second data to the fourth application. In comparison, upon a first delete request of the third application and a second delete request of the second application, the first application can deny the second delete request and can delete the second data in respond to the first delete request.

To illustrate, consider an example of a device that executes a weather application and a smart home application. The weather application can present weather data, whereas the smart home application can present temperature data and can control smart appliances, such as a smart thermostat, that are communicatively coupled with the device based on the temperature data (e.g., to cause a hot air flow when the temperature drops below a temperature threshold). A remote application executing on a server can send weather data to the device, where the weather data is specific to a geographic location of the device, includes temperature data, and is sent whenever there is a temperature change at the geographic location. The device can include the herein above mentioned data store and a data store application that controls use of the data store by the weather application, the smart home application, and the remote application. In particular, the data store application configures a partition in the data store and associates the partition with permission data indicating that only the latest weather data sent from the remote application can be stored in the partition, that the weather application has access to all the data stored in the partition, and that the smart home application has access to the temperature data only. Upon a temperature change, the remote application sends weather data to the device, and, in response, the data store application deletes previously stored weather data from the partition and writes the updated weather data in the partition. Upon a user input requesting an output of the weather application, the weather application can send a read request to the data store application identifying the partition. The data store application returns the weather data stored in the partition to the weather application that then generates an output describing the weather. Upon a trigger (e.g., a user input or an automated trigger), the smart home application can also request the weather data from the data store application. Here, the data store application determines that only the temperature data can be returned and retrieves and sends this data from the partition to the smart home application.

Embodiments of the present disclosure provide several technological advantages. For example, rather than an application of the device pulling data repeatedly from an application executing remotely from the device, a push mechanism can be used to send data when an update to the data occurs. Further, the data can be accessible to multiple applications of the device. As such, the processing burden and network bandwidth usage can be reduced. Additionally, the data can be stored on the device even before an application of the device requests the data. As such, the latency related to retrieving the data can be reduced, which may in turn improve the user interface responsiveness. These and other technological advantages are further described and will become more apparent in connection with the figures herein below.

FIG. 1A illustrates an example of a device 110 that includes a data store 112 and a data store application 111 that controls use of the data store 112 by a plurality of applications, according to an embodiment of the present disclosure. Generally, the device 110 can execute an application locally. Such an application is referred to herein as a device application. A computing component remote from the device, such as a server, can execute an application that sends data to the device. Such an application is referred to herein as a remote application.

Figure 20:
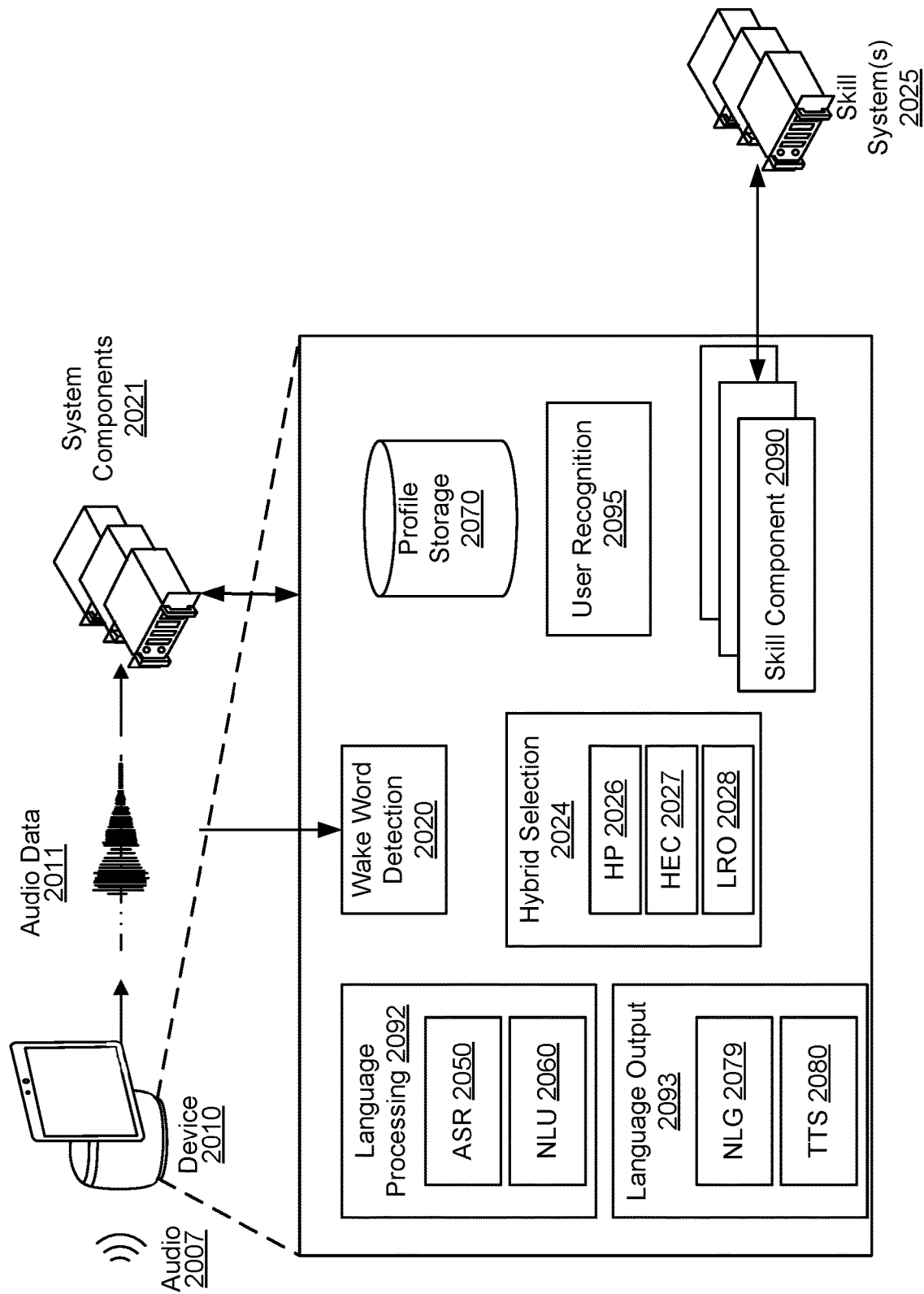
FIG. 20 is a conceptual diagram illustrating components that may be included in a device, in accordance with embodiments of the present disclosure.

As illustrated in FIG. 1, the device 110 executes three device applications: a data store application 111, a weather application 117, and a smart home application 119, although a different number of device applications is possible. The device 110 also receives data from a remote application 130 (this data is shown in FIG. 1 as weather data 132 that may include temperature data for illustrative purposes), although a different number of remote applications can be executed and the device 110 can receive data from each remote application. The data store application 111 controls use of the data store 112 by the remote application 130, the weather application 117, and the smart home application 119. As further described in FIG. 20, a device application, such as the weather application 117 or the smart home application 119, can be a skill component 2090. In an example, the speech processing described in connection with FIG. 20 is suitable for speech-based user interactions with the device application. Also as further described in FIG. 20, the remote application 130 can be a skill component of a skill system 2025. In an example, the speech processing described in connection with FIG. 20 is suitable for speech-based user interactions with the remote application 130.

In an example of controlling the use of the data store 112, the data application 111 generates a partition 113 within the data store 112 and associates the partition with a set of permissions. For example, the data application 111 can generate permission data indicating, for particular device applications and/or particular remote applications, permissions related to one or more manipulation operations permitted on data that can be stored in the partition 113. The manipulation operations can include write operations, read operations, delete operations, edit operations, and the like. For example, the permission data indicates that only the remote application 130 can write data to the partition 113, that the weather application 117 can read all of the data stored in the partition 113, and that the smart home application 119 read only a portion of the data stored in the partition 113 (e.g., only the temperature data). The data store application 111 can store this data in the data store 112, such as in the partition.

The remote application 130 can send data (e.g., the weather data 132) to the device 110 proactively such that the device 110 can receive and store the data (e.g., in the data partition 112) before the need for such data by device applications (e.g., before a request of the weather application 117 and/or the smart home application 119 to receive the data). In an example, a push mechanism is used by the remote application 130 to send the data. In particular, when an update to the data is determined, the remote application 130 can send the update to the device 110 with a write request indicating the partition. In turn, the data store application 111 can look up the permission data and determine that the remote application 130 is permitted to write the data to the partition 113. Accordingly, the data store application 111 writes the data to the partition 113 (shown as weather data 115).

Next, the device 110 can present a home application user interface (UI) 104 corresponding to the smart home application 119. The home application UI 104 can show and enable interaction with a number of smart home functions. For example, the device 110 can be communicatively coupled with a smart thermostat. A temperature target to be used by the smart thermostat can be set via the home application UI 104. The operations of the smart thermostat can depend on the environmental temperature indicated by the weather data 132. The home application UI 104 can also show some of the data of the remote application 130, such as by showing the environmental temperature. In both cases (controlling the temperature target or presenting the environmental temperature), the smart home application 119 can determine that temperature data 105 is available from the partition 113 and, accordingly, send a read request to the data store application 111 indicating the partition 113 and a particular entry (e.g., a temperature entry) in the partition 113. Here, the data store application 111 can look up the permission data and determine that the smart home application 119 is permitted to read the temperature data 105 from the entry in the partition 113. Accordingly, the data store application 111 reads and sends the temperature data 105 from the weather data 115 stored in the partition 113 to the smart home application 119 that, in turn, presents it in the home application UI 104.

Similarly, the device 110 can present a weather application user interface (UI) 106 corresponding to the weather application 117. The weather application UI 106 can show the environmental temperature and a temperature prediction over a future time window. To do so, the weather application 111 can determine that current and predicted temperature data 107 is available from the partition 113 and, accordingly, send a read request to the data store application 111 indicating the partition 113 and a particular entry in the partition 113. Here, the data store application 111 can look up the permission data and determine that the smart home application 119 is permitted to read any of the weather data 115 stored in the partition 113. Accordingly, the data store application 111 reads and sends the current and predicted temperature data 107 from the weather data 115 stored in the partition 113 to the weather application 111 that, in turn, presents it in the weather application UI 106.

In an example, the device 110 is configured to implement speech processing. An example implementation is further described in FIG. 20. The device 110 can detect speech input of a user and generate audio data representing the speech input. Speech processing can be applied to a portion of the audio data to detect a wake word. If the wake word is detected, speech processing can be applied to a remaining portion of the audio data determine an intent for a particular output. The output can be provided by one of the device applications. As such, at least a part of the speech processing result (e.g., a command indicating the requested output) can be input to the relevant device application that then further processes it and presents the output. In this case, presenting the output can include retrieving data from the data store 112 to be presented as part of the output. The presentation can be on a graphical user interface (GUI) and/or a voice user interface (VUI).

Referring back to the example of the weather application 117, speech input can be received indicating a request for a weather report. Here, the speech processing can indicate that the weather application 117 can present an output describing a weather forecast. In turn, the weather application 117 sends a read request to the data store application 111 for a read of the weather data 115 to receive back the weather data 115 stored in the partition 113 and present it as the weather forecast. In another example and referring back to the smart home application 119, speech input can be received indicating a request to view thermostat temperature controls. Here, the speech processing can indicate that the smart home application 119 can present an output describing the temperature target set by a smart thermostat and the environmental temperature. For the temperature target, the smart home application 119 can retrieve this data from a storage location on the device 110 other than the data store 112 (or the partition 113) and associated with the smart home application 119. For the environmental temperature, the smart application 119 can determine that the temperature data is available from the partition 113 and can send a read request to the data store application 111 for a read of the temperature data from the partition 113 to receive back and present the temperature data as the environmental temperature. In both examples, the weather data (including the temperature data) is proactively stored on the device 110 (e.g., received from the remote application prior to any of the two read requests). As such, there is no need for the device 110 to request this data from the remote application 130, which can reduce the processing latency associated with presenting the output.

Figure 1B:
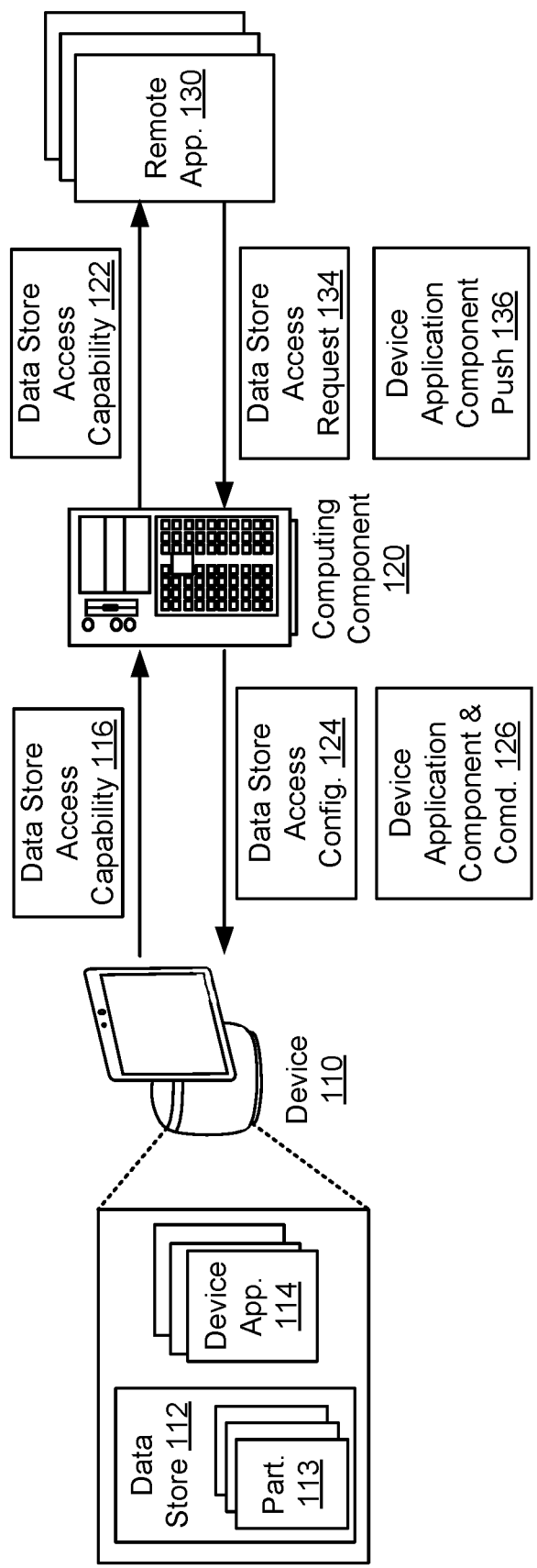
FIG. 1B illustrates an example of a network environment for managing updates sent to a device, according to an embodiment of the present disclosure.

FIG. 1B illustrates an example of a network environment for managing updates to the device 110, according to an embodiment of the present disclosure. As illustrated, the network environment includes the device 110 communicatively coupled (e.g., over a data network, such as one including the Internet) with a computing component 120 that is remote from the device 110. As shown in FIG. 1A, the device 110 includes the data store 112 and a set of device applications 114. The device applications 114 can include the data store application 111, the weather application 117, and the smart home application 119 described herein above. As further described in FIG. 20, a device application 114 can be a skill component 2090. In an example, the speech processing described in connection with FIG. 20 is suitable for speech-based user interactions with the device application 114. A set of remote applications, include the remote application 130, can be executing on one or more computing components that are remote from the device 110, such as a set of servers. Generally, the data store 112 is configured to store updates (e.g., data and/or software packages) that may be sent by any one of the remote applications (e.g., via a push mechanism). The device applications 114 can access and use the updates stored in the data store 112 (e.g., render data in the case of an update being update data, and/or execute a software package in the case of an update being an update software package). Configuring the data store 112 and remote use thereof by the remote applications can be facilitated via the computing component 120.

In an example, the device 110 can be operated by a user associated with an account registered with the computing component 120 and can include one or more processors and one or more memory that store computer-readable instructions that, upon execution by the one or more processors, configure the device to perform operations as described herein. For instance, the device 110 can be any of smart speaker (headless or with a display, as illustrated in FIG. 1), a smart phone, a tablet, a laptop computer, a desktop computer, a wearable device, a smart set top box, a smart television, a smart appliance, an Internet of Things (IoT) device, and the like. In comparison, the computing component 120 can be operated by a service provider and implemented as hardware (e.g., a set of hardware servers) or software hosted on hardware (e.g., a cloud-based service) suitable for communication with devices over one or more data networks. Generally, the computing component 120 includes one or more processors and one or more memory that store computer-readable instructions that, upon execution by the one or more processors, configure the computing component to perform operations as described herein.

Configuring and using the data store 112 can include multiple procedures. In an example, the device 110 (e.g., the data store application 111 executing on the device 110) can send data indicating a data store access capability 116 to the computing component 120. Among other things, the data can indicate that the device 110 includes the data store 112 and that this data store 112 is usable to receive updates. The data can also indicate configuration parameters of the data store 112, such as a maximum storage size allowed per application, a maximum storage size of the data store 112, a maximum number of partitions across all applications 130, the capability to upgrade storage (e.g., to add partitions, increase the size of a partition, etc.), and the like. Although a single data store access capability 116 is illustrated in FIG. 1, two or more of such capabilities can be used. For instance, a first data store access capability 116 can relate to data and can indicate the capability of the device 110 associated with using the data store 112 to store data. A second data store access capability 116 can relate to software packages and can indicate the capability of the device 110 associated with using the data store 112 to store software packages.

Based on the account associated with device 110, the computing component 120 can determine the device applications 114 that are installed on the device 110 and that the data store access capability 116 has been enabled for use. For each device application 114, the computing component determines the corresponding application 130 and can send data indicating data store access capability 122 of the device 110. The data store access capability 122 may, but need not be, the same as the data store access capability 116. For example, this data indicates, to the remote application 130, that the data store 112 is available for use by the remote application 130 and the maximum storage size allowable for the remote application 130.

Based in the data store access capability 122, the remote application 130 can send a data store access request 134 to the computing component 120. The data store access request 134 can include data indicating a configuration and an access control policy to use for configuring a set of partitions in the data store 112 for use by the remote application 130. For example, the configuration can indicate a number of partitions to generate, an identifier of each partition, a number of namespaces to generate in each partition, an identifier of each namespace, a number of entries to use, and an identifier of each entry. These and other configuration parameters of the data store 112 are further illustrated in the next figures. The access control policy can indicate permissions associated with access the partition(s), namespace(s), and/or entry(ies). A permission can be specific to a device application 114 that corresponds to the remote application 130.

The computing component 120 can authenticate the remote application 130 (e.g., based on credentials that the remote application 130 sends to the computing component 120 along with or in the data store access request 134 and based on credentials that the computing component 120 pre-stores for the remote application 130). Upon authentication 120, the computing component can determine (e.g., based on the account) that the device 110 has globally enabled the data store 112 for use by applications and/or specifically for use by the remote application 130. The computing component 120 can then generate and send, based on the data store access request 134, data indicating a data store access configuration 124 to the device 110. This data can indicate the configuration and access control specified by the remote application 130 and can include a credential of the remote application 130. This credential 130 may be an application identifier, an access token, or some other form of credential data that may not be accessible to and/or mocked by the remote application 130.

In turn, the device 110 (e.g., the data store application 111) configures the data store 112 according to the data store access configuration 124. For example, the partition(s) and namespace(s) are generated. In addition, the device 110 stores the access control policy to control the access permission to the partition(s), namespace(s), and/or entry(ies). In a further example, prior to checking the access control policy for an access permission, the device 110 (e.g., the data store application) can control the access of the remote application 130 to the data store 112 by authenticating the remote application 130 and determining that the access us authorized. To do so, the device can add the credential to a set of application credentials and add an authorization to a set of application authorizations. The set of application credentials is used to authenticate an application requesting the access to the data store. The set of application authorizations is used to determine that an authenticated application is authorized to access the data store 112.

Based on an update applicable to the device 110, the remote application 130 sends a push 136 to the computing component. This push 136 can include the update (e.g., data and/or a software package) and can indicate the device 110 or a push parameter (e.g., that the update applies to a set of devices that share the push parameter, such as a device type, an operating system, a device application, a network address, a geographic location, etc.). In turn, the computing component 120 determines that the push 126 applies to the device 110 and that the data store access capability 116 is enabled and the data store 112 has been configured (e.g., based on the account). The computing component 120 then sends the update and a command to the device 110. This command can indicate an operation for the device 110 to perform on the update and can include the credential of the remote application 130. The operation can depend on the type of the push. As explained herein above, the push can be data (e.g., weather data, a smart appliance status data, etc.) and/or a software package (e.g., a software update to a weather device application, a software update to a smart home device application, etc.). In the case of data, the command can be to write the data (or, more generally put object) to a particular partition, namespace, and/or entry. In the case of a software package, the command can be to store only, store and install, store and replace, where the storage can be in a particular partition, namespace, and/or entry.

The device 110 (e.g., the data store application 111) can authenticate the remote application 130 based on the credential. For instance, the credential is checked against the set of application credentials. A match with one of the application credentials indicates that the remote application 130 is authenticated. The device 110 can also determine that the remote application 130 is authorized to access the data store 130 by, for instance, determining that the matched credential is associated with an application authorization to do so. The access policy corresponding to the credential is then checked and a determination is made that the operation is permitted. The device 110 then performs the operation by, for example, at least storing the update in the particular partition, namespace, and/or entry.

Figure 2:
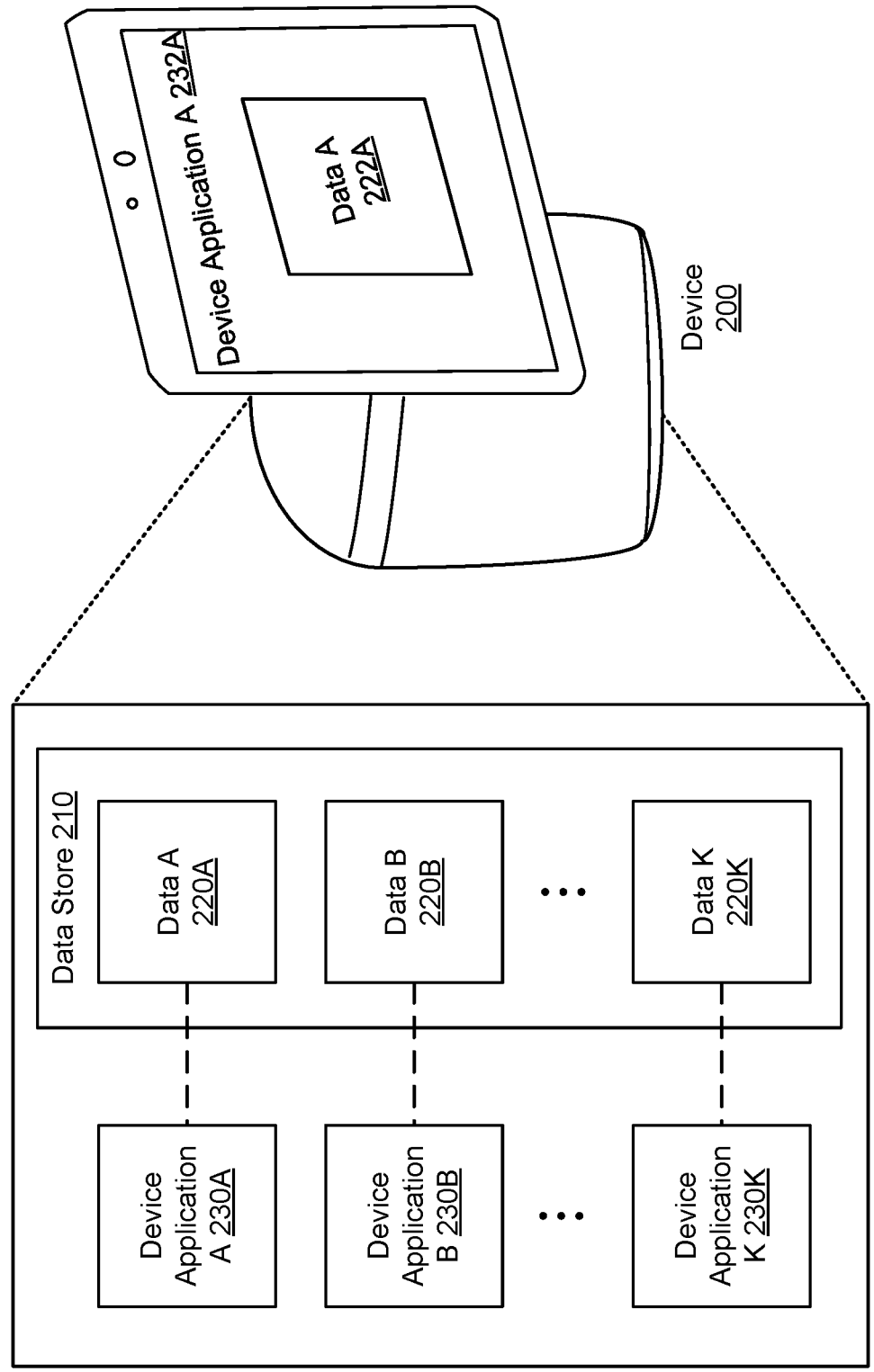
FIG. 2 illustrates an example of data updates, according to an embodiment of the present disclosure.

FIG. 2 illustrates an example of data updates, according to an embodiment of the present disclosure. A device 200 includes a data store 210 configured to store data sent (e.g., via pushes) from applications executing remotely from the device 200. The device 200 also stores device applications, each possible corresponding to one of the remote applications. Each device application can be stored in one or more memory of the device 200 as a program code executable by one or more processors of the device 200. The data store 210 can be a storage space within the same one or more memory or within different one or more memory of the device 200.

In the illustration of FIG. 2, the data store 210 includes "K" partitions (where "K" is a positive integer). In a first partition, "data A 220A" is stored in response to a data push from a first remote application. In a second partition, "data B 220B" is stored in response to a data push from a second remote application, and so on and so forth, until a $K^{th}$ partition that stores "data K 220K" in response to a data push from a $K^{th}$ remote application. A first "device application A 230A" corresponds to the first remote application, a second "device application B 230B" corresponds to the second remote application, and so on and so forth, until a Kth "device application K 230K" that corresponds to the Kth remote application. As further described in FIG. 20, each of the device applications 230A through 230K can be a skill component 2090. In an example, the speech processing described in connection with FIG. 20 is suitable for speech-based user interactions with any of such device applications 230A-230K. Further, each of the remote applications can correspond to a skill component of a skill system 2025.

In also the illustration of FIG. 2, a one-to-one access policy is used. In particular, each partition is generated for a remote application and is associated with an access control policy generated based on a data store access request of the remote application. The access control policy of a partition generated for a remote application indicates that data stored therein is only accessible to a device application that corresponds to the remote application. This indication can be effectuated by storing the credential of the remote application in the access control policy. As such, and as indicated by the dashed lines, the "data A 220A" is accessible to the "device application A 230A" only, the "data B 220B" is accessible to the "device application B 230B" only, and so on and so forth.

As such, when a particular device application is executed, data from only the associated data partition can be accessed. In the illustration of FIG. 2, when the "device application A 230A" is executed, the "data A 220A" (or a portion thereof) can be accessed from the first partition and used in an output at a user interface of the device 200. The result of its execution is shown as a "device application A 232A" presenting "data A 222A" (e.g., a portion of the "data A 220A") on a graphical user interface (GUI) of the device 200.

To illustrate, the remote application can correspond to an online weather service executing on a server, "device application A 230A" can correspond to a weather application executing locally on the device 200 and interfacing with the online service, and the "data A 220A" can include temperature, humidity, and other weather data that are pushed, upon a change, from the remote application. Upon the execution of the device application A 230, the device 110 can then present, for instance, the temperature by retrieving this data from the first partition.

Note, however, that the same approach can apply to when a template of a device application is used by another device application (e.g., a renderer application), as long as the access control policy permits the access to the other device application. For example, and referring back to the weather application, a renderer application can present weather data in a card (or some other user interface element) among many cards. When the card is in view, the renderer application can access the weather data from the first partition and renders it in the card.

When a data access request is made (e.g., a read request), the device 200 (e.g., a data store application executing on the device 200) can determine parameters of this request. For example, each device application can store a credential of the corresponding remote application (e.g., by including this credential in its template). The data access request associated with a device application (e.g., generated by the device application or by a renderer application that uses the template of the device application) can include the credential of the corresponding application, an identifier of a storage location within the data store 210 (e.g., an identifier of a partition, an identifier of a namespace, and/or an identifier of an entry). The device 200 (e.g., the data store application) can first authenticate the request (or, equivalently, the device application and/or the remote application) by comparing the credential to a set of application credentials and can also determine that the request is authorized based on a set of application authorizations. Thereafter, the device 200 (e.g., the data store application) can determine, based on the access control policy corresponding to the partition, that the requested data can be accessed to then retrieve and send the data in a response to the data access request (e.g., in a read response).

Figure 3:
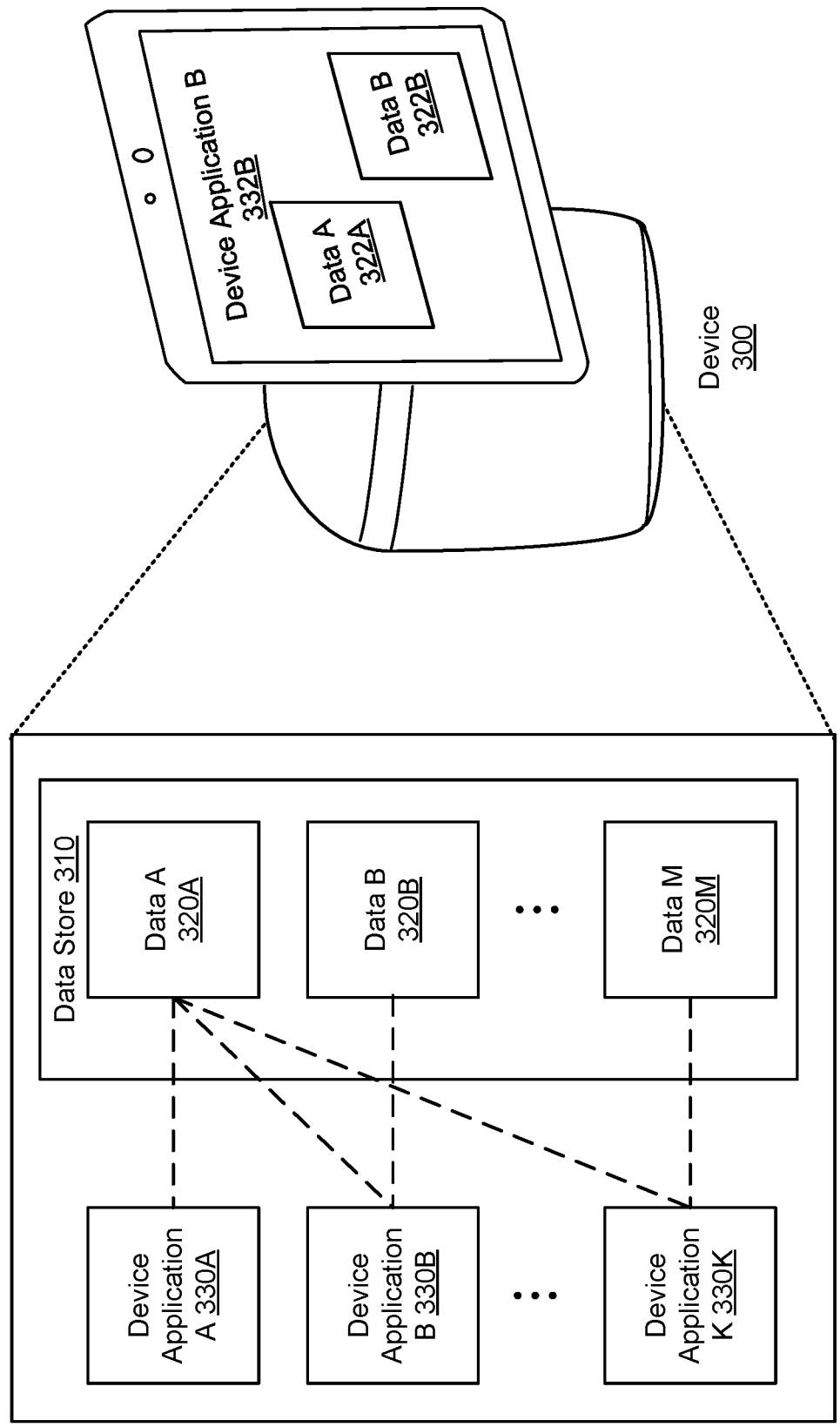
FIG. 3 illustrates another example of data updates, according to an embodiment of the present disclosure.

FIG. 3 illustrates another example of data updates, according to an embodiment of the present disclosure. Unlike FIG. 2, here data stored in a partition that corresponds to a remote application can be accessible not only to a device application that corresponds to the remote application, but also to one or more device applications corresponding to one or more other remote applications. This shared access can be facilitated via an access control policy defined based on data from a data store access request of the application.

As illustrated, a device 300 includes a data store 310 configured to store data sent (e.g., via pushes) from remote applications executing remotely from the device 300. The device 300 also stores device applications, each possibly corresponding to one of the remote applications. Each device application can be stored in one or more memory of the device 300 as a set of instructions that can be executed by one or more processors of the device 300. The data store 310 can be a storage space within the same one or more memory or within different one or more memory of the device 300.

In the illustration of FIG. 3, the data store 310 includes "M" partitions (where "M" is a positive integer). In a first partition, "data A 320A" is stored in response to a data push from a first remote application. In a second partition, "data B 320B" is stored in response to a data push from a second remote application, and so on and so forth, until a Mth partition that stores "data M 320M" in response to a data push from a Mth remote application. A first "device application A 330A" corresponds to the first remote application, a second "device application B 330B" corresponds to the second remote application, and so on and so forth, until a Kth "device application K 330K" that corresponds to a Kth remote application (where "K" is also a positive integer that may be different from "M"). As further described in FIG. 20, each of the device applications 330A through 330K can be a skill component 2090. In an example, the speech processing described in connection with FIG. 20 is suitable for speech-based user interactions with any of such device applications 230A-230K. Further, each of the remote applications can correspond to a skill component of a skill system 2025.

In also the illustration of FIG. 3, a shared access policy is used. In particular, each partition is generated for a remote application and is associated with an access control policy generated based on a data store access request of the remote application. The access control policy of a partition generated for a remote application indicates that data stored therein is accessible to a device application that corresponds to the remote application and to one or more device applications corresponding other remote applications. This indication can be effectuated by storing the credential of each of such applications in the access control policy. As indicated by the dashed lines, the access control policy associated with the first partition indicates that the "data A 320A" is not only accessible to the "device application A 330A," but is also accessible to the "device application B 330B" and the "device application K 330K." In comparison, the access control policy of each of the second partition and the $M^{th}$ partition indicates that each of the "data B 320B" and the "data M 32M" is accessible by the corresponding device application only.

As such, when a particular device application is executed, data from permitted data partition(s) can be accessed. In the illustration of FIG. 3, when the "device application B 330B" is executed, the "data A 320A" (or a portion thereof) can be accessed from the first partition and used in an output at a user interface of the device 300. Likewise, the "data B 320B" (or a portion thereof) can be accessed from the second partition and used in an output at a user interface of the device 300. The result of its execution is shown as a "device application B 332B" presenting "data A 322A" (e.g., a portion of the "data A 320A") and "data B 322B" (e.g., a portion of the "data B 320B") on a GUI of the device 300.

To illustrate, "device application B 330B" can correspond to a smart home device application, and the "data A 320A" can include temperature, humidity, and other weather data that are pushed, upon a change, from a weather application, and "data B 320B" can include status data of smart appliances (e.g., door locked, security system enabled, thermostat temperature setting set to a particular value, etc.). Upon the execution of the smart home device application, the device 110 can then present, for instance, the outside temperature by retrieving this data from the first partition and the home temperature by retrieving the thermostat temperature from the second partition.

Note, however, that the same approach can apply to when the template of the device application is used by another device application (e.g., a renderer application), as long as the access control policy permits the access to the other device application. For example, and referring back to the smart home application, a renderer application can present weather data and status data in a card (or some other user interface element) among many cards. When the card is in view, the renderer application can access the weather data and the status data from the first and second partitions and renders the access data in the card.

When a data access request is made (e.g., a read request), the device 300 (e.g., a data store application executing on the device 300) can determine parameters of this request. The parameters can be similar to those described in connection with FIG. 2. Further, to use a shared access policy, the parameters can include additional application credentials. This type of parameters is described herein next.

In an example, a partition is configured for a first remote application having a first device application and is accessible to a second device application that corresponds to a second remote application. The first and second remote applications are associated with a first credential and a second credential, respectively. The access control policy defined for the first partition can include the first and second credentials and can set access permissions based on such credentials. A data access request associated with the second device application (e.g., generated by the second device application or by a renderer application that uses the document of the second device application) can include the second credential, an identifier(s) of a storage location(s) within the data store 310 (e.g., an identifier of each partition to be accessed, an identifier of each namespace to be accessed, and/or an identifier of each entry to be accessed). The device 300 (e.g., the data store application) can first authenticate the request (or, equivalently, the device application and/or the remote application) by comparing the second credential to a set of application credentials and can also determine that the request is authorized based on a set of application authorizations. Thereafter, the device 300 (e.g., the data store application) can determine, based on the access control policy of the first partition, that the requested data can be accessed based on the second credential to then retrieve and send the data in a response to the data access request (e.g., in a read response).

Referring to the above illustrative example, the smart home device application can store (e.g., by including in its template) the credential. The first partition storing weather data can include this credential and can indicate that only the temperature data is accessible in association with this credential. In this case, the read request associated with the smart home device application can be checked against the access control policy of the weather application. Because this policy includes the smart home application credential, the smart home application is permitted to access the temperature data. Accordingly, the temperature data is retrieved from the first partition.

Figure 4:
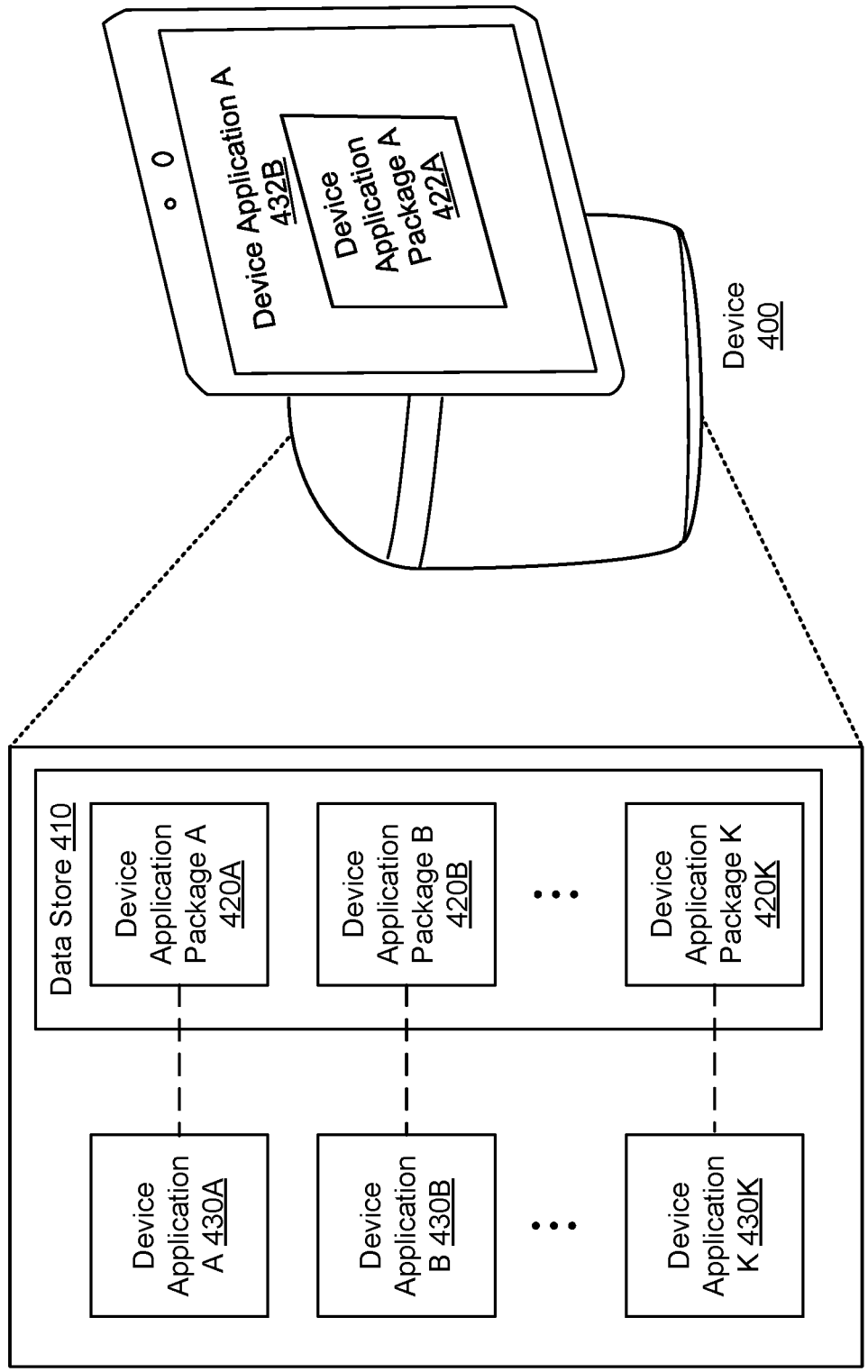
FIG. 4 illustrates an example of software package updates, according to an embodiment of the present disclosure.

FIG. 4 illustrates an example of software package updates, according to an embodiment of the present disclosure. The updates are similar to those described in connection with FIG. 2, except that they are specific to software packages (e.g., to a set of instructions) rather than to data. As illustrated, a device 400 includes a data store 410 configured to store software packages sent (e.g., via pushes) from remote applications executing remotely from the device 400. The device 400 also stores device applications, each corresponding to one of the remote applications. Each device application can be stored in one or more memory of the device 400 as a set of instructions that can be executed by one or more processors of the device 400. The data store 410 can be a storage space within the same one or more memory or within different one or more memory of the device 400.

In the illustration of FIG. 4, the data store 410 includes "K" partitions (where "K" is a positive integer). In a first partition, a "software package A 420A" is stored in response to a push from a first remote application. In a second partition, a "software package B 420B" is stored in response to a push from a second remote application, and so on and so forth, until a $K^{th}$ partition that stores a "software package K 420K" in response to a push from a $K^{th}$ remote application. A first "device application A 430A" corresponds to the first remote application, a second "device application B 430B" corresponds to the second remote application, and so on and so forth, until a $K^{th}$ "device application K 430K" that corresponds to the $K^{th}$ remote application. Each software package can include a software update to the corresponding device application. As further described in FIG. 20, each of the device applications 430A through 430K can be a skill component 2090. In an example, the speech processing described in connection with FIG. 20 is suitable for speech-based user interactions with any of such device applications 430A-430K. Further, each of the remote applications can correspond to a skill component of a skill system 2025.

In also the illustration of FIG. 4, a one-to-one access policy is used. In particular, each partition is generated for a remote application and is associated with an access control policy generated based on a data store access request of the remote application. The access control policy of a partition generated for a remote application indicates that a software package stored therein is only accessible to a device application that corresponds to the remote application. This indication can be effectuated by storing the credential of the application in the access control policy. As such, and as indicated by the dashed lines, the "software package 420A" is accessible to the "device application A 430A" only, the "software package B 420B" is accessible to the "device application B 430B" only, and so on and so forth.

As such, when a particular device application is executed or needs to be updated (e.g., by a system application of the device 400), the software package from only the associated data partition can be accessed. In the illustration of FIG. 4, to update the "device application A 430A," the "software package A 420A" (or a portion thereof) can be accessed from the first partition and used (e.g., installed). The result of this update is shown as a "device application A 432A" using a "software package A 422A" (e.g., a portion of the "software package A 420A").

To illustrate, the remote application can correspond to an online weather service, "device application A 430A" can correspond to a weather device application, and the "software package A 420A" can include a set of instructions to present a ten-day weather forecast. Upon the update of the weather device application, the device 110 can then start presenting the ten-day weather forecast.

When an access request is made (e.g., an install request), the device 400 (e.g., a data store application executing on the device 400) can determine parameters of this request. For example, each device application can store a credential of the corresponding remote application (e.g., by including this credential in its template). The access request associated with a device application (e.g., generated by the device application or by an install application that uses the template of the device application) can include the credential of the corresponding remote application, an identifier of a storage location within the data store 410 (e.g., an identifier of a partition, an identifier of a namespace, and/or an identifier of an entry). The device 400 (e.g., the data store application) can first authenticate the request (or, equivalently, the device application and/or the remote application) by comparing the credential to a set of application credentials and can also determine that the request is authorized based on a set of application authorizations. Thereafter, the device 400 (e.g., the data store application) can determine, based on the access control policy corresponding to the partition, that the requested software package can be accessed to then retrieve and send it in a response to the access request.

Figure 5:
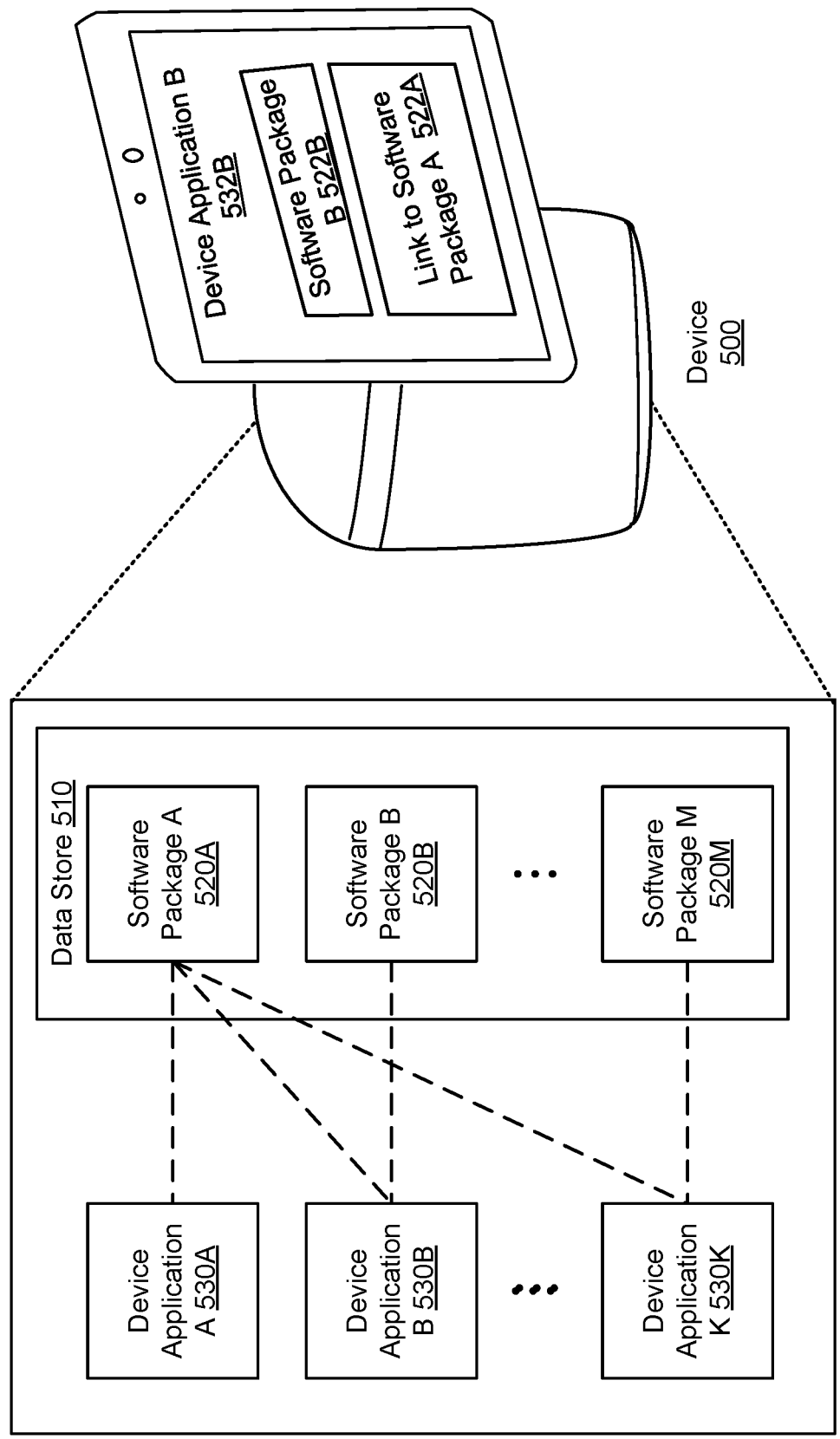
FIG. 5 illustrates another example of software package updates, according to an embodiment of the present disclosure.

FIG. 5 illustrates another example of software package updates, according to an embodiment of the present disclosure. Unlike FIG. 4, here a software package stored in a partition that corresponds to a remote application can be accessible not only to a device application that corresponds to the remote application, but also to one or more device applications corresponding to one or more other remote applications. This shared access can be facilitated via an access control policy defined based on data from a data store access request of the application.

As illustrated, a device 500 includes a data store 510 configured to store software packages sent (e.g., via pushes) from remote applications executing remotely from the device 500. The device 500 also stores device applications, each corresponding to one of the remote applications. Each device application can be stored in one or more memory of the device 500 as a set of instructions that can be executed by one or more processors of the device 500. The data store 510 can be a storage space within the same one or more memory or within different one or more memory of the device 500.

In the illustration of FIG. 5, the data store 510 includes "M" partitions (where "M" is a positive integer). In a first partition, a "software package A 520A" is stored in response to a push from a first remote application. In a second partition, a "software package B 520B" is stored in response to a push from a second remote application, and so on and so forth, until a $M^{th}$ partition that stores a "software package M 520M" in response to a push from a $M^{th}$ remote application. A first "device application A 530A" corresponds to the first remote application, a second "device application B 530B" corresponds to the second remote application, and so on and so forth, until a $K^{th}$ "device application K 530K" that corresponds to a $K^{th}$ remote application (where "K" is also a positive integer that may be different from "M"). As further described in FIG. 20, each of the device applications 530A through 530K can be a skill component 2090. In an example, the speech processing described in connection with FIG. 20 is suitable for speech-based user interactions with any of such device applications 530A-530K. Further, each of the remote applications can correspond to a skill component of a skill system 2025.

In also the illustration of FIG. 5, a shared access policy is used. In particular, each partition is generated for a remote application and is associated with an access control policy generated based on a data store access request of the remote application. The access control policy of a partition generated for a remote application indicates that software package stored therein is accessible to a device application that corresponds to the remote application and to one or more device applications of other remote applications. This indication can be effectuated by storing the credential of each of such remote applications in the access control policy. As indicated by the dashed lines, the access control policy associated with the first partition indicates that the "software package A 520A" is not only accessible to the "device application A 530A," but is also accessible to the "device application B 530B" and the "device application K 530K." In comparison, the access control policy of each of the second partition and the $M^{th}$ partition indicates that each of the "software package B 520B" and the "software package M 52M" is accessible by the corresponding device application only.

As such, when a particular device application is executed or needs to be updated (e.g., by a system application), software package(s) from permitted data partition(s) can be accessed. In the illustration of FIG. 5, when the "device application B 530B" is updated, the "software package A 520A" (or a portion thereof) can be accessed from the first partition and used in the update. Likewise, the "software package B 520B" (or a portion thereof) can be accessed from the second partition and used in the update. The result of the update is shown as a "device application B 532B" using a link to the "software package A 522A" (e.g., a portion of the "software package A 520A") and using "software package B 522B" (e.g., a portion of the "software package B 520B").

Different techniques may exist for accessing a software package of another device application. For example, a first device application corresponding to a first remote application can access a software package of a second remote application. A second device application can correspond to the second remote application. The software package can be stored in a storage location within the data store 510 (e.g., a partition, a namespace, and/or an entry), where this storage location is configured for the second remote application. The access here can include linking the first device application to the second device application or, at least, to the software package. The linking can be via the instructions that define the first device application. For instance, such instructions (e.g., in a template of the first device application) can store a link to storage location.

To illustrate, "device application B 530B" can correspond to a smart home device application, the "software package B 520B" can include first instructions for displaying a forecasted power consumption of a smart appliance, and the "software package A 520A" can include second instructions for displaying a ten-day weather forecast. Upon the update to the "device application B 530B," this program would now include the first instructions and a link to the second instructions. When a GUI of the updated "device application B 530B" is presented, this GUI can show the forecasted power consumption and can include a selectable GUI element linked to the second instructions. Upon this GUI element being selected, the weather device application can be executed and can present a GUI that shows the ten-day weather forecast.

When a data access request is made (e.g., a read request), the device 500 (e.g., a data store application executing on the device 500) can determine parameters of this request. The parameters can be similar to those described in connection with FIG. 4. Further, to use a shared access policy, the parameters can include additional application credentials. This type of parameters is described herein next.

In an example, a partition is configured for a first remote application having a first device application and is accessible to a second device application of a second remote application. The first and second remote applications are associated with a first credential and a second credential, respectively. The access control policy defined for the first partition can include the first and second credentials and can set access permissions based on such credentials. An access request associated with the second device application (e.g., generated by the second device application or by a an install application that uses the template of the second device application) can include the second credential, an identifier(s) of a storage location(s) within the data store 510 (e.g., an identifier of each partition to be accessed, an identifier of each namespace to be accessed, and/or an identifier of each entry to be accessed). The device 500 (e.g., the data store application) can first authenticate the request (or, equivalently, the device application and/or the remote application) by comparing the second credential to a set of application credentials and can also determine that the request is authorized based on a set of application authorizations. Thereafter, the device 500 (e.g., the data store application) can determine, based on the access control policy of the first partition, that the requested software package can be accessed based on the second credential.

Figure 6:
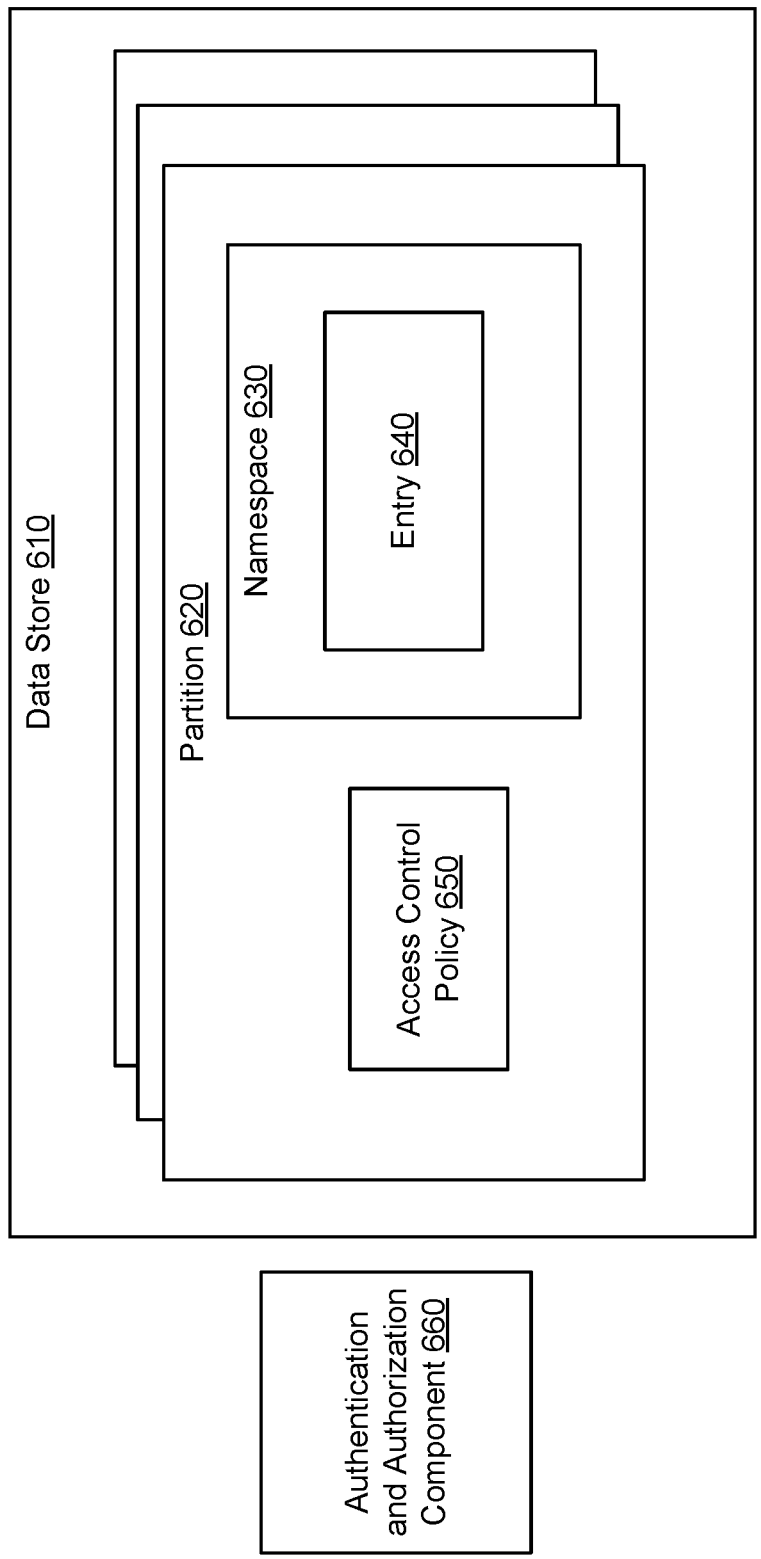
FIG. 6 illustrates an example of a data store and related access controls, according to an embodiment of the present disclosure.

FIG. 6 illustrates an example of a data store 610 and related access controls, according to an embodiment of the present disclosure. The data store 610 can be an on-device storage and can be associated with a data store application executable to control access to and operations on the data store 610. The operations can include write, read, manipulate, update, and other operations related to updates that can be stored in the data store 610.

Generally, the data store 610 can include multiple partitions 620. Each partition 620 can be configured for a remote application executing remotely from the device and associated with an access control policy 650. The remote application can be a skill component of a skill system, as further described in FIG. 20. A partition 620 can be a storage region within the on-device storage and can be identified by a region identifier that is unique to the corresponding application. Further, the partition can include one or more namespaces 630. A namespace 630 can be a logical partition within the storage region where the corresponding application can store its updates across separate partitions. The namespace 630 can be identified with a namespace identifier unique within storage region. The namespace 630 can also include one or more entries 640. An entry 640 can be an entity within the namespace 630, where this entity can store an update (or a portion thereof) according to a particular data structure (e.g., the entity can be an object storing data according to a JSON structure). A particular schema may be used for the storage. For instance, a key-value schema can be used for storage in an entry. A key can be an entry identifier that is unique to an entry 640 within a namespace 630 within a partition 620.

In an example, an access control policy 650 can be defined for a partition 620 and can be granular to the partition level, a namespace level, or an entry level. The access control policy may be stored in the partition 650. Further, the access control policy 650 can be identified with a policy identifier that is unique within the partition 650. Generally, the access control policy 650 defines and controls access to the partition 620, the namespace(s) 630 within the partition 620, and/or the entry(ies) 640 within each namespace 630. The definition can indicate whether an access is permitted or not. An access permission can be global (e.g., to all the partition 620) or specific (e.g., to a particular set of namespaces 630 and/or set of entries 640) The control can be effectuated by storing a credential for each remote application (or, equivalently, device application) to which the access is permitted. In a further example, a single access control policy 650 can be defined for multiple partitions 620. Conversely, multiple access control policies 650 can apply to a single partition 620.

Additionally, the data store application can include an authentication and authorization component 660. This component 660 can be executed to determine whether access by a remote application or a device application (e.g., a skill component of a skill system 2025 or a skill component of the device) to the data store 610 is authenticated and permitted. For instance, when a partition 620 is configured for a remote application, a credential of the remote application can be included in a set of application credentials that the authentication and authorization component 660 manages. An access authorization to the data store 610 (rather than to specific partition 620) can also be added to a set of application authorizations also managed by the authentication and authorization component 660, where this access authorization can be associated with the credential. As such, when an access request is received (e.g., based on a request of a remote application executing remotely from the device or based on a request of a corresponding device application executing locally on the device), this request can include a credential, and the authentication and authorization component 660 can determine a match between this credential and the set of application credentials to authenticate this request (or, equivalently the remote application or the device application) and can determine an application authorization from the set of application authorizations corresponding to the matched credential to determine that the access to the data store 610 is authorized.

In an example, the authentication and authorization component 660 may authorize and authenticate a device application that requests access to the data store 610 in a manner similar to authorizing and authenticating a remote application. Here, the device application can include (e.g., in its template) the credential(s), and the access request can include such credential(s) that the authentication and authorization component 660 then processes. Alternatively, no authorization and/or authentication of the device application may be performed. Instead, downloading or installing the device application on the device can follow a controlled and secured mechanism. Thereafter, access to the data store 610 can be assumed to be authenticated and authorized for the device application. However, the device application still needs to present the credential(s) for processing against the access control policy 650 before access to a specific storage location within the data store 610 (e.g., to the partition 620) is permitted.

Figure 7:
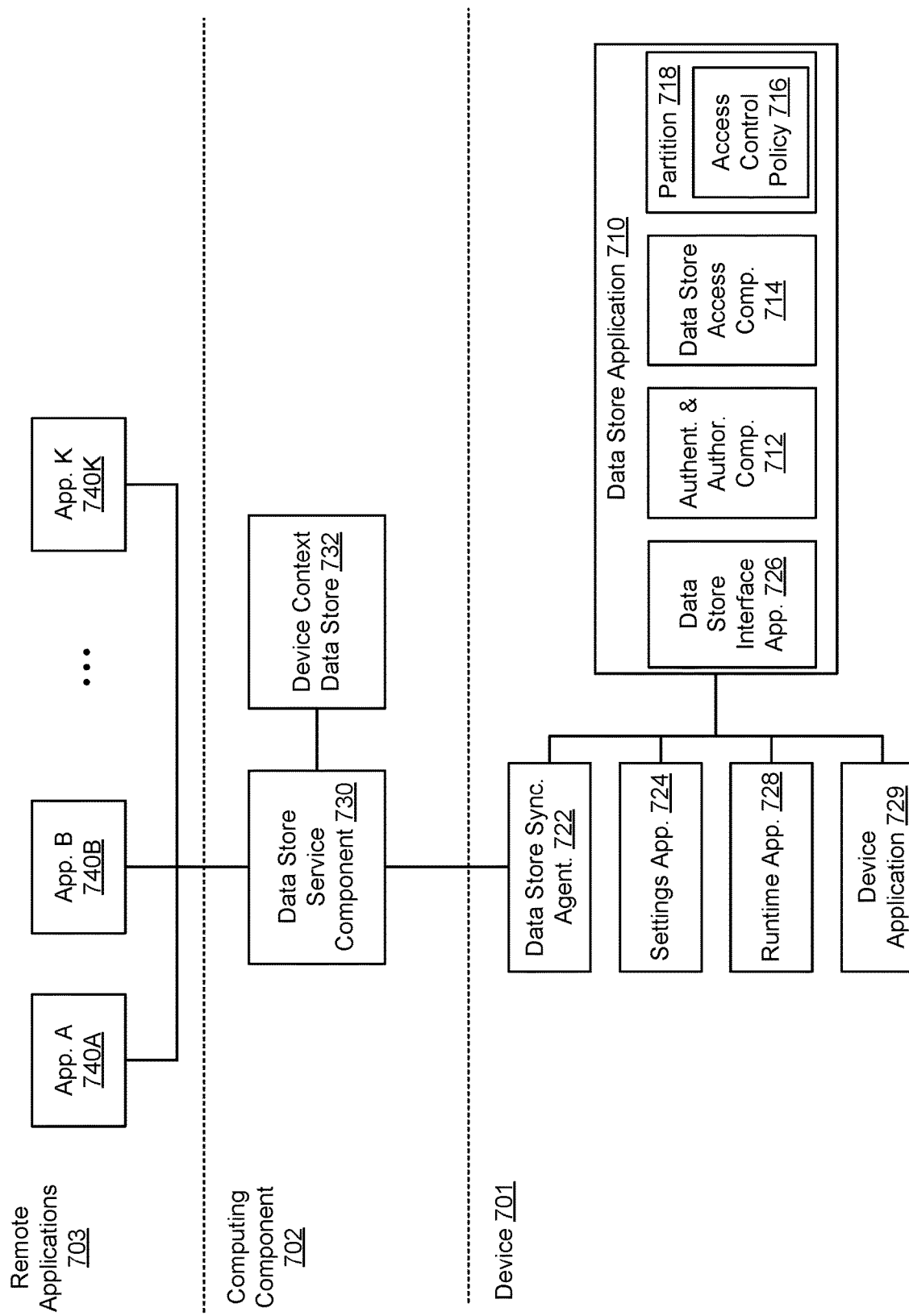
FIG. 7 illustrates an example of an architecture for updates, according to an embodiment of the present disclosure.

FIG. 7 illustrates an example of an architecture for updates, according to an embodiment of the present disclosure. This architecture is distributed between a device that includes a data store (shown as a device 701), a computing component 702 that facilitates the configuration and remote use of the data store, and servers that execute remote applications 702.

The device 701 can include a data store application 710 (similar to the one described in connection with FIG. 6). The data store application 710 can include an authentication and authorization component 712, similar to the authentication and authorization component 660 of FIG. 6. The data store application 710 can also include a data store access component 714 that can handle access requests (e.g., received via application programming interface (API) calls) to a data store of the device 701. The data store application 710 also stores and updates an access control policy 716 (or multiple of such policies) that controls access to a partition 718 (or multiple partitions, namespaces, and/or entries) of the data store.

The device 701 also includes (e.g., as executable software components) a data store synchronization agent 722, a settings application 724, a data store interface application 726, a runtime application 728, and a device application 729. The data store synchronization agent 722 can receive commands of the computing component. Based on these commands, the data store synchronization agent 722 can send access requests to the data store (e.g., as API calls to the data store access components). Further, the data store synchronization agent 722 can receive event data from the data store application 710 and other applications or components of the device and send such event data to the computing component. Event data can relate to a particular event, such as an error event associated with a requested access to the data store, a pull event requesting data to be pulled from an application, a start event indicating that a particular user interface element of a device application is being output (e.g., visible), an end event indicating that the particular user interface element is no longer being output, and the like. The setting application 724 can be configured to synchronize some settings of the device with settings of other devices that are registered under the same account with the computing component. Such settings can be used by different device applications and applications across the devices. The runtime application 728 can be an application that is executed at runtime and that can access templates (e.g., documents to render user interfaces) of different device applications (including, possibly, the device application 729) such that it can render data of the different device applications (e.g., as a set of cards organized in a carousel on a GUI). The data store interface application 726 enables the runtime application 728 to access the data for these device applications from the data store by making access requests (e.g., as API calls to the data access component 714). The device application 729 can include a document (e.g., an APL document) and executable code to provide a set of functionalities on the device. The device application 729 can correspond to one or more of the remote applications 740A-740K, whereby the set of functionalities can be supported by the corresponding application(s). As further described in FIG. 20, the device application 729 can be a skill component of the device 701, whereas some or each of the remote applications 740A-740K can be a skill component of a skill system.

The computing component 702 can include a data store service component 730 and a device context data store 720. The data store service component 730 can configure the data store, can authenticate remote applications requesting access to the data store, can initiate commands for the access, can receive event data, and can send the event data to the relevant remote applications. In an example, a remote application is made available via the computing component via a registration and publication procedure. This procedure can involve the computing component storing configuration data (e.g., a manifest) of the remote application. The configuration data can include a first credential for authenticating the remote application. Upon receiving an access request of the remote application, the data store service component 730 can determine a second credential included in or along with the access request and can authenticate the remote application based on a match between the credential and the configuration data. The access request can be a request to configure a partition in the data store for the remote application and/or to store an update (or perform any other operation) in the partition. This request can be received via an API of the data store service component 730, where this API can be common to the different remote applications. An API call of the remote application can indicate a set of commands that needs to be executed in the data store, parameters for the execution (e.g., target devices or other parameters usable to identify one or more devices, an identifier of a partition, an identifier of namespace, an identifier of an entry), and, possibly, the second credential. In the case of storing an update, the API call can also include a payload, such as the update itself.

Upon the authentication of the remote application, the data store service component 730 can generate and/or determine, from storage, a third credential that is unique to the remote application and that cannot be mocked by the remote application. The third credential can be included in or along a command sent to the device (e.g., to the data store synchronization agent 722). The command can include a set of instructions that the data store synchronization agent 722 uses to generate an API call to the data store access component 714.

Additionally, the computing component 702 can maintain a list identifying device applications that the device has stored and the association of each device application with an application. Data indicating whether the data store's capability of the device for data and/or software packages have been enabled and/or whether such capability is enabled for a particular remote application can also be maintained. The computing component can also receive, from the device, and store data indicating a particular configuration of the data store access capability of the and whether data store is currently available or unavailable (e.g., even when the device is communicatively coupled to the computing component and is online, the data store may not be available when the data store application 710 may not be executing). Any or all of such data can be stored in the device context data store 732 and pulled therefrom by the data store service component 730 as needed.

At the remote application level, multiple remote applications may be executing on one or more servers (shown as an "application A 740A," an "application B 740 B," and so on and so forth until "application K 740 K"). A remote application can represent a skill or a set of capabilities that can be remotely executed for the device.

A remote application can receive data from the data store service component 730 indicating that the data store's capability has been enabled, request (e.g., via an API call), a partition to be configured in the data store (where this configuration includes a definition of the access control policy that applies to the partition), and request (e.g., via a same or a different API call) an update to be stored in the partition (or some other operation to be performed). The remote application can also receive event data and respond, as needed (e.g., if a pull event is determined, the application can send data via an API call).

Figure 8:
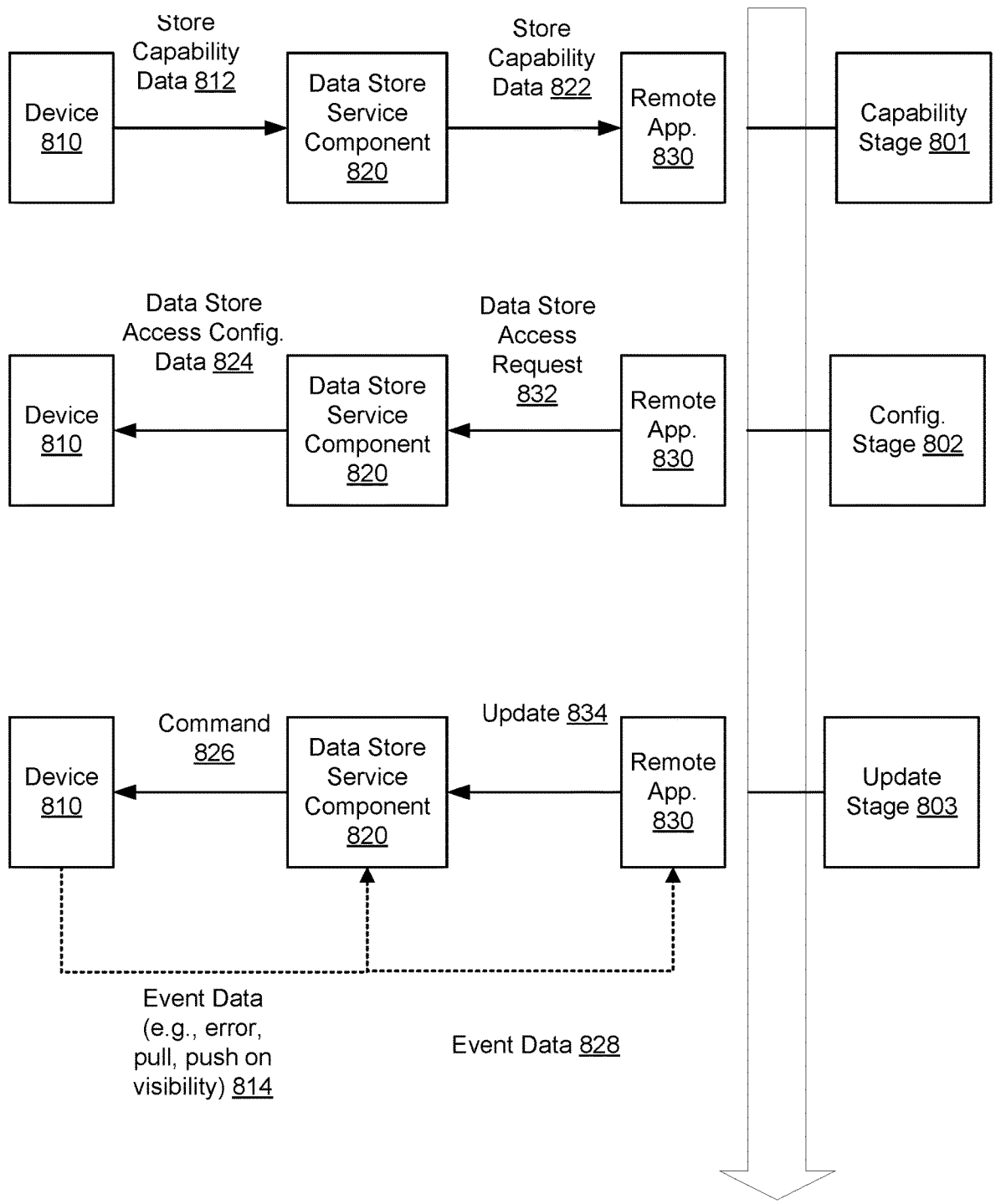
FIG. 8 illustrates an example of a diagram for updates, according to an embodiment of the present disclosure.

FIG. 8 illustrates an example of a diagram for updates, according to an embodiment of the present disclosure. Here, a network environment includes a device 810 executing a data store application, a data store service component 820 executing on a computing component, and a remote application 830 executing on a server, similarly to the components described in connection with FIG. 7. The remote application 830 can be a skill component of a skill system, as further described in FIG. 20. As illustrated, the diagram includes multiple stages: a capability stage 801, a configuration stage 802, and an update stage 802. Each of these stages is described herein below.

During the capability stage 801, the device 810 sends data 812 indicating its data store access capability for data and/or software packages to the computing component (e.g., to the data store service component 820 or any other component of the computing component that stores the corresponding data in a device context data store). For instance, the data store application can generate and send this data 812 to a data store synchronization agent that, in turn, sends it to the data store service component 820. In turn, based on a list identifying device applications stored on the device 810, the data store service component 820 determines that the remote application 830 has a corresponding program stored on the device and sends thereto data 822 indicating data store access capability of the device.

During the configuration stage 802, the remote application 830 determines that access to the data store of the device 810 is available and, as such, sends a data store access request 832 to the data service component 820. This request 832 can be sent via an API call indicating that a partition is to be generated, configuration parameters of the partition (e.g., a partition identifier, a namespace identifier, and/or an entry identifier), and an access control policy to associate with the partition. In turn, the data service component 820 authenticates the remote application 830, and generates and sends, to the device 810 (e.g., to the data store synchronization agent) a command indicating the data store access configuration 824 (e.g., including the configuration parameters, the access control policy, and a credential(s) to use in the access control policy).

The device 810 (e.g., data store synchronization agent) receives this data, configures a partition accordingly, stores the access control policy, and adds the credential of the remote application 830 to a set of application credentials and adds an authorization to access to a set of application authorizations to access the data store. The device 810 (e.g., data store synchronization agent) can send event data indicating a confirmation that the partition was successfully configured or an error event about an error in the configuring.

Assuming a successful configuration, the update stage 803 may consequently occur. During the update stage 803, the remote application 830 may determine that an update 834 to an update is needed. The remote application 830 can send a push request to the data store service component 820 via an API call. This request can include the update 834, and indicate push parameters (e.g., by including a particular device identifier, an account identifier, or some other parameters usable to determine the relevant devices) and indicate that this update 834 is to be stored in a data store (e.g., in a particular partition, namespace, and/or entry). The data store service component 820 can authenticate the remote application 830 and determine, based on the push parameters and data about devices, that the update 834 is to be sent to the device 810. The data store service component 820 can then generate a command 826 that includes the update 834 and identifies the partition, namespace, and/or entry, and an operation to be performed thereon (e.g., a store operation). This command 826 can be sent to the device 810 (e.g., to the data store synchronization agent) that then processes it (e.g., by the data store application). If the processing is successful, the update 834 is stored in the data store and event data 814 can be sent indicating a success. Otherwise, the update 834 is not stored in the data store and the event data 814 indicates an error. Additionally or alternatively, event data 814 can be sent to indicate a start event and/or an end event. The event data 814 can be received by the data store service component 820 and sent to the remote application 830 as event data 828. In the case of a start event, the remote application 830 can start its push mechanism to send the update 834 and this push mechanism can persist for some predefined amount of time or until an end event is indicate to the remote application 830.

Once the update 834 is stored in the data store, a device application can access it. This access can be via an authentication and authorization component of the data store application first and, subsequently, can depend on the access control policy defined for the partition storing the update 834.

FIGS. 9-12 illustrate example flows related to using a data store of a device. Some or all of operations of such flows may be performed under the control of a computing component, such as the computing component 120, that includes a data store service component and that stores in its one or more memory instructions corresponding to the operations and executable by on one or more processors of the computing component.

Figure 9:
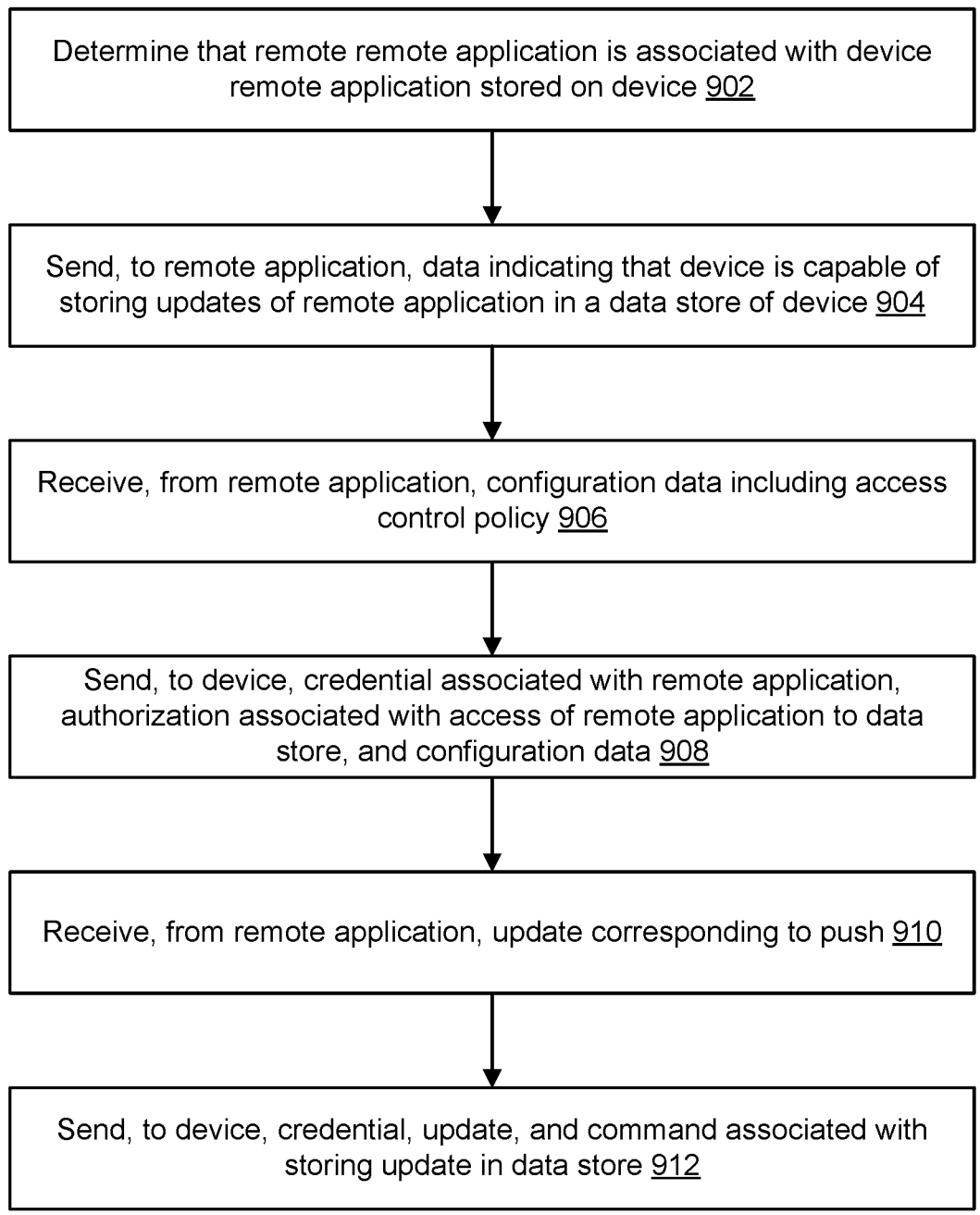
FIG. 9 illustrates an example of a flow for an update to a device, according to an embodiment of the present disclosure.

FIG. 9 illustrates an example of a flow for sending an update to a device, according to an embodiment of the present disclosure. The flow may be repeated for multiple updates. As illustrated, the flow may start at operation 902, where the computing component determines that a remote application is associated with a device application stored on a device. For instance, the computing component maintains a list indicating device applications that are installed on the device and the correspondence between each installed device application and a remote application. Based on this list, the computing component cand determine that the remote application is associated with the device application.

At operation 904, the computing component sends, to the remote application, data indicating that the device is capable of storing updates of the remote application in a data store of the device. For example, the computing component receives data from the device indicating that a data store capability has been enabled. The computing component can also determine from this data or from account data associated with the device that the data store capability is to be made available to the remote application. The computing component can then send the data to the remote application, where this data indicates that the data store capability and a configuration of the data store (e.g., a maximum storage size of a partition, a maximum number of partitions, etc.).

At operation 906, the computing component receives, from the remote application, configuration data including an access control policy. For example, the configuration data indicates the configuration for a partition to be generated for the remote application in the data store (e.g., the size and identifier of the partition, an identifier of a namespace, and/or an identifier of an entry). The configuration data can also include permissions to access and perform operations related to the partition, namespace, and/or entry and can include an identifier of each permitted application.

At operation 908, the computing component sends, to the device, a credential associated with the remote application, an authorization associated with access of the remote application to the data store, and configuration data. The credential can be generated by the computing component and/or determined from storage accessible to the computing component and can be unique to the remote application and non-mockable by or non-accessible to the remote application. If another remote application is also permitted to access the partition, the computing component can also send a credential corresponding to the other remote application. The authorization can indicate that the remote application has access to the data store without being specific to a partition. The configuration data can include the access control policy, which may be augmented to include the credential and any other relevant credential(s), in addition to the specific partition, namespace, and entry configurations.

At operation 910, the computing component receives, from the remote application, an update corresponding to a push of the remote application. The update can be a data update and/or a software package update. The computing component determines that this update is applicable to the device. The push can indicate the partition, the namespace, and/or the entry.

At operation 912, the computing component sends, to the device, a credential associated with the remote application, the update, and a command associated with storing the update in the data store. The credential can be the same as the credential described in connection with operation 908. The command can instruct the device to store the update in the partition, the namespace, and/or the entry.

Figure 10:
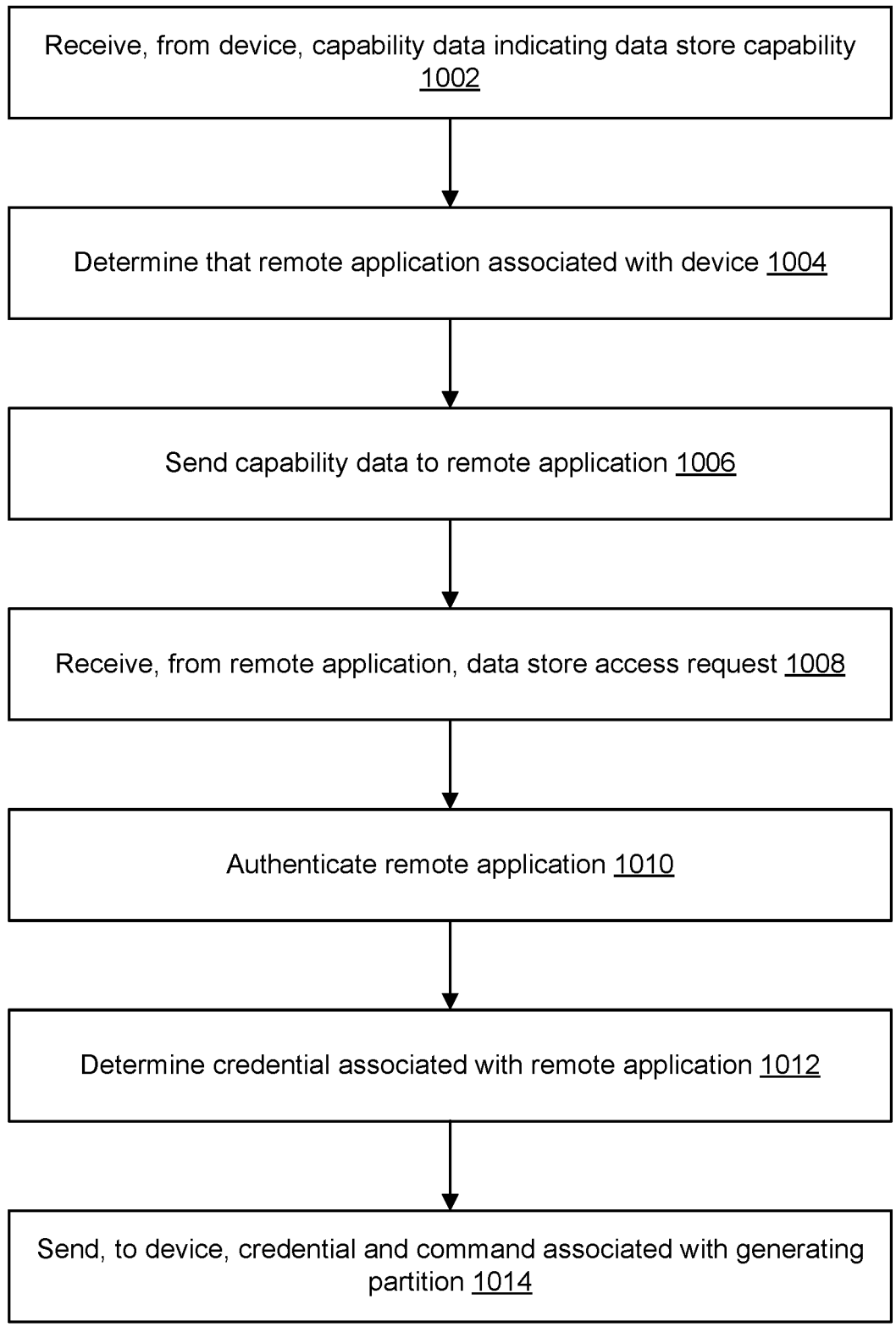
FIG. 10 illustrates an example of a flow for configuring a data store of a device, according to an embodiment of the present disclosure.

FIG. 10 illustrates an example of a flow for configuring a data store of a device, according to an embodiment of the present disclosure. Operations of the flow can be implemented as sub-operations of particular operations of the flow of FIG. 9.

As illustrated, the flow of FIG. 10 may start at operation 1002, where the computing component receives, from the device, capability data indicates a data store capability. For example, the capability data can be generated by a data store application of the device and sent via a data store synchronization agent of the device. The capability data can indicate possible configurations of the data store, such as a maximum storage size per partition, a maximum number of partitions per application, etc.

At operation 1004, the computing component determines that a remote application is associated with a device. For example, the list identifying the installed device applications is looked up to determine that an installed device application on the device corresponds to the remote application.

At operation 1006, the computing component sends the capability data (or a portion thereof) to the remote application. For example, the computing component indicates, to the remote application, that the data store capability is enabled and can indicate some or all of the possible configurations of the data store.

At operation 1008, the computing component receives, from the remote application, a data store access request. This request can be received via an API call and can include a credential of the remote application, configuration data for generating a partition, and a command to generate the partition according to the configuration data.

At operation 1010, the computing component authenticates the remote application. For example, the computing component determines that the credential matches a credential from a manifest of the remote application.

At operation 1012, the computing component determines a credential associated with the remote application. This credential can be different from the credential received at operation 1008. In this case, the credential may not be mockable by and not accessible to the remote application. Instead, the computing component generates or determines from storage this non-mockable, non-accessible credential. In an example, this mockable, non-accessible credential can be a unique device identifier and/or an access token and can be encrypted with a key associated with the device (e.g., with a public key of the device).

At operation 1014, the computing component sends the credential determined at operation 1012 and a command associated with generating the partition to the device. The command can include configuration data of the partition and a set of instructions to generate the partition according to the configuration data. The credential and the command can be sent to the data store synchronization agent.

Figure 11:
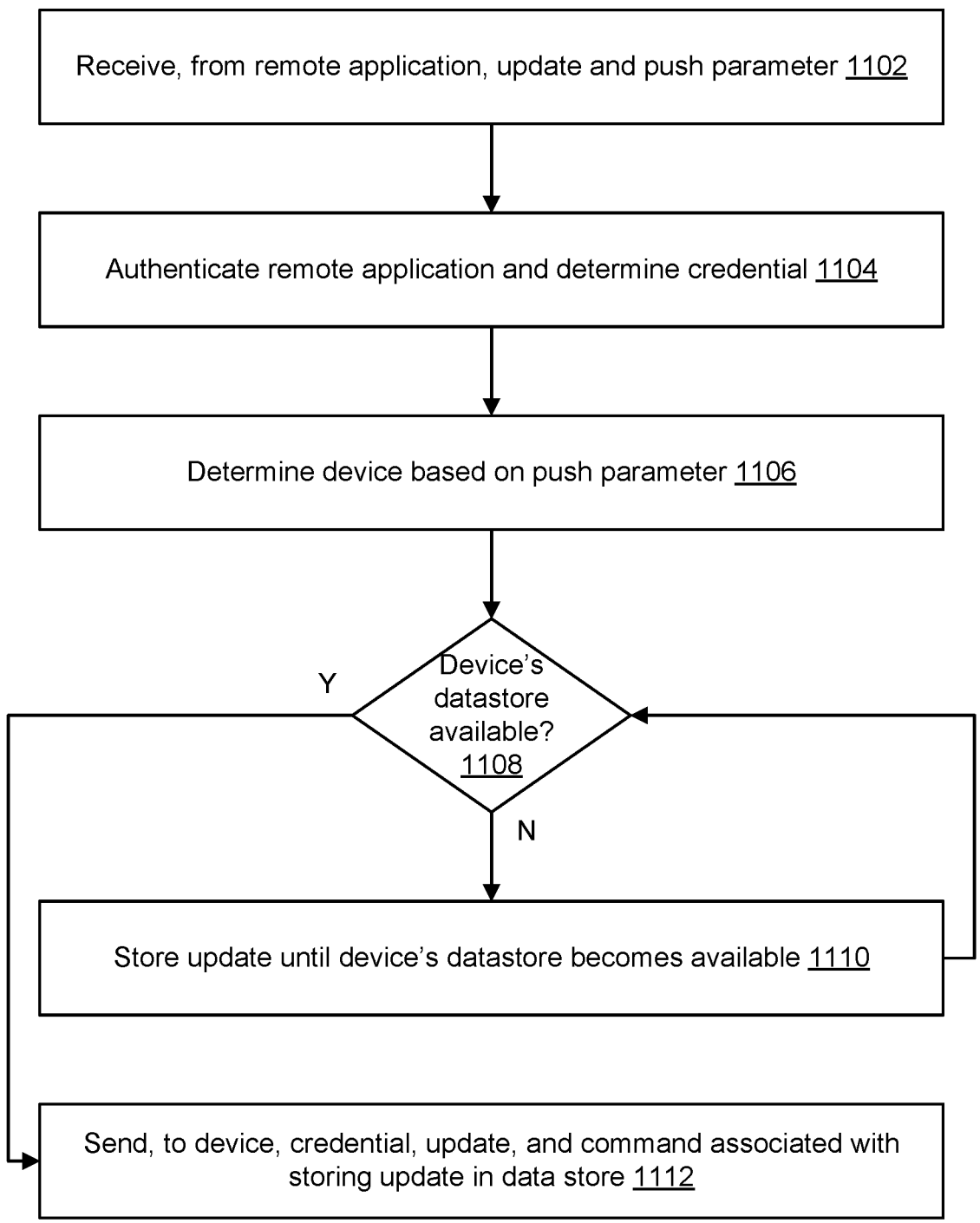
FIG. 11 illustrates an example of a flow for managing updates, according to an embodiment of the present disclosure.

FIG. 11 illustrates an example of a flow for managing updates, according to an embodiment of the present disclosure. Operations of the flow can be implemented as sub-operations of particular operations of the flow of FIG. 9.

As illustrated, the flow of FIG. 11 may start at operation 1102, where the computing component receives, from a remote application, an update and a push parameter. The update and the push parameter can be received via an API call to the data store service component. A partition within the data store of the device may have been configured for the remote application as described herein above. The update can be updated data and/or an updated software package to be pushed to the data store. This push can be absent of event data indicating a start event or can be performed upon a push mechanism being triggered by the start event. The push parameter can include an identifier of the device or data that the computing component uses to determine that the push applies to the device (e.g., a network address, a geographic location, a type of device, etc.).

At operation 1104, the computing component authenticates the remote application and, upon authentication, determines a credential of the remote application to include in a command to send to the device. This operation 1104 can be similar to operations 1010 and 1012 of FIG. 10.

At operation 1106, the computing component determines the device based on the push parameter. In the case of the push parameter including the device identifier, the computing component identifies the device according to the device identifier. Otherwise, the computing component can look up device configuration data to determine a match with the push parameter and identifies the device according to the match. In certain situations, multiple devices are identified, and the push can be sent to all these devices (e.g., a single API call from the remote application can result in multiple commands by the data store service component). In a further example, when a device is identified, the computing component determines, based on account data associated with the device identifier, whether the data store capability of the device has been enabled and, if so, whether it is enabled for the remote application. If so, the push can be sent to the device.

At operation 1108, the computing component determines whether the device's data store is available. If unavailable, operation 1110 may follow operation 1108. Otherwise, operation 1112 may follow operation 1108. Different reasons may exist for the device's data store to be unavailable. For example, the device may be powered off, may be rebooting, or may not be communicatively coupled with the computing component (e.g., by being offline). In this case, the computing component can store data indicating the availability or unavailability. This data can be stored in response to event data from the data store application indicating that the data store is to become unavailable or based on lack of a response to a ping (e.g., a heartbeat) by the data store service component to the remote application data store.

At operation 1110, the computing component stores the update until the device's data store becomes available. The computing component can also store a timer that may expire. If the availability data is received before the time expires (e.g., as indicated in the loop back to operation 1108), the flow may proceed to operation 1112. Otherwise, the push may not be sent to the device and an error message can be sent to the remote application.

At operation 1112, the computing component sends, to the device, the credential, the update, and a command associated with storing the update in the data store. The command can instruct the device to store the update in a particular partition, namespace, and/or entry.

Although the above flow is described in connection with storing an update, the flow can be similarly and equivalently applied to other types of operations. For instance, a delete operation can be performed, whereby the remote application can request that a particular entry or namespace in a partition be deleted, and the computing component may send the corresponding command to the device.

Figure 12:
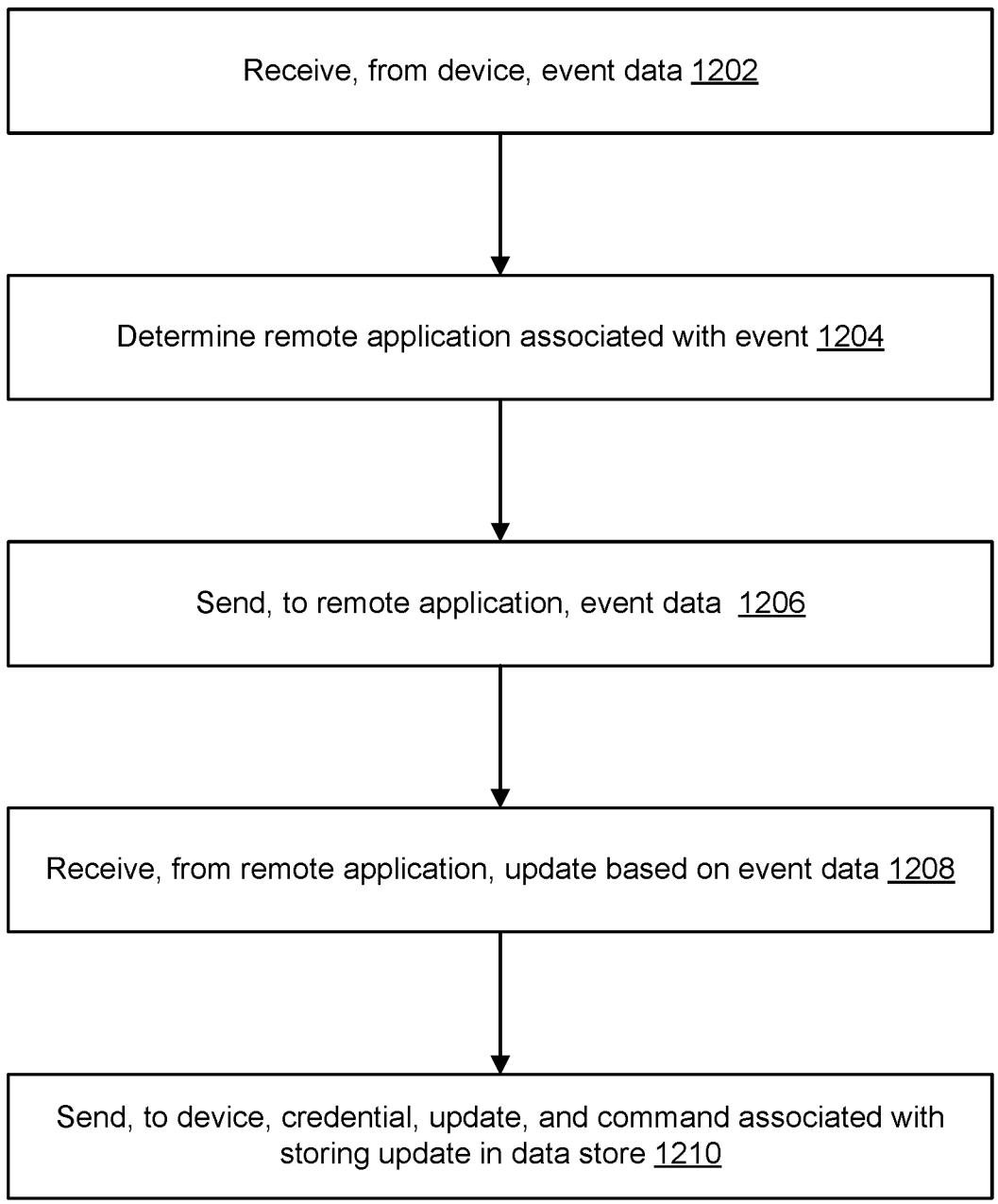
FIG. 12 illustrates an example of a flow for processing event data related to an update, according to an embodiment of the present disclosure.

FIG. 12 illustrates an example of a flow for processing event data related to an update, according to an embodiment of the present disclosure. Operations of the flow can be implemented as sub-operations of particular operations of the flow of FIG. 9.

As illustrated, the flow of FIG. 12 may start at operation 1202, where the computing component receives, from the device, event data. For example, the event data can be sent by the data store synchronization agent and can indicate an error event (e.g, a partition was not configured or an update was not stored), a pull event (e.g., a particular application or component of the device requesting a data pull and/or a device application pull, a start event (e.g., indicating that a GUI element correspond to an application is being viewed), an end event (e.g., indicating that the GUI element is no longer being viewed), and/or other events that may be relevant to an application.

At operation 1204, the computing component determines a remote application associated with the event data. For example, the event data can include a credential associated with the remote application. The computing component identifies the remote application based on the credential.

At operation 1206, the computing component sends the event data to the remote application. For example, the event data is sent via an API call to the remote application.

At operation 1208, the computing component receives, from the remote application, an update based on the event data. For example, in the case of a previous failure to store the update, the remote application can resend this update (or a modified version thereof). In the case of a start event, the remote application is triggered to the send the update. Receiving the update can be similar to operation 1102 of FIG. 11.

At operation 1210, the computing component sends, to the device, a credential of the remote application, the update, and a command associated with storing the update in the data store. This operation can be similar to operation 1112 of FIG. 11.

Figure 13:
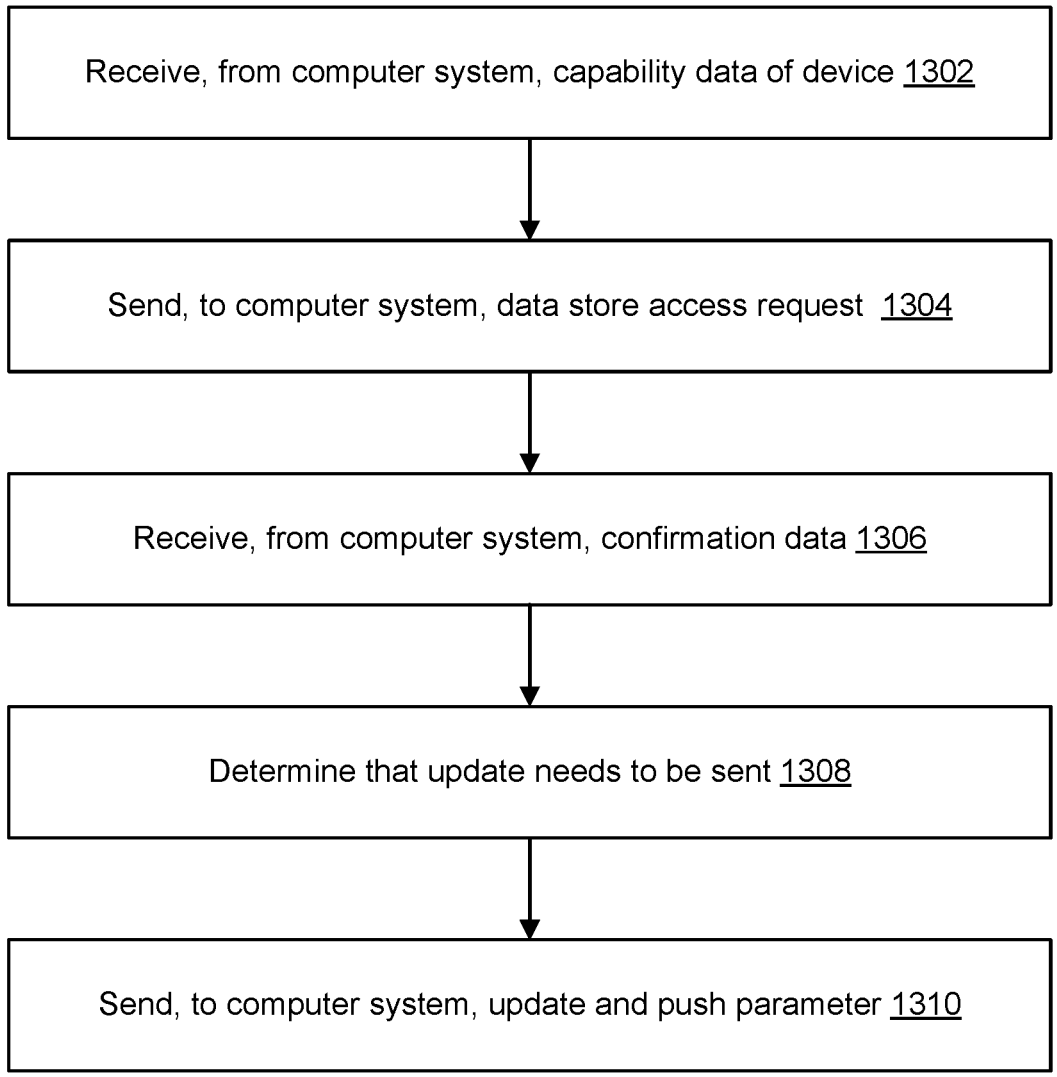
FIG. 13 illustrates an example of a flow for using a data store of a device, according to an embodiment of the present disclosure.

FIG. 13 illustrates an example of a flow for the remote application using a data store of a device, according to an embodiment of the present disclosure. Some or all of operations of the flow may be performed under the control of a server (or some other computing component) that executes the remote application and that stores in its one or more memory instructions corresponding to the operations and executable by on one or more processors of the computing component.

As illustrated, the flow may start at operation 1302, where the server receives, from the computing component, capability data of the device. This capability data can indicate that the data store capability is enabled, and that the remote application is permitted to use the data store and can include configuration parameters for configurating a partition within the data store for the remote application.

At operation 1304, the server sends, to the computing component, a data store access request. This request can be sent via an API call and correspond to the request described in connection with operation 1008 of FIG. 10.

At operation 1306, the server receives, from the computing component, confirmation data that the partition was configured. This confirmation data can be sent in an API response upon a successful configuration of the partition. In case of a configuration failure, error data may be received instead.

At operation 1308, the server determines that an update needs to be sent. This update can be to data used by a device application corresponding to the remote application and/or to a software package of the device application.

At operation 1310, the server can send the update and a push parameter to the computing component. This operation 1310 can be triggered by the determination of the update or by a start event determined from event data received from the computing component. In both situations, the update and the push parameter can be sent in an API call to the data store service component in a manner similar to operation 1102 of FIG. 11.

FIGS. 14-17 illustrate example flows for using the data store of the device, according to an embodiment of the present disclosure. Some or all of operations of such flows may be performed under the control of the device that executes, among other things, the data store application and that stores in its one or more memory instructions corresponding to the operations and executable by on one or more processors of the computing component.

Figure 14:
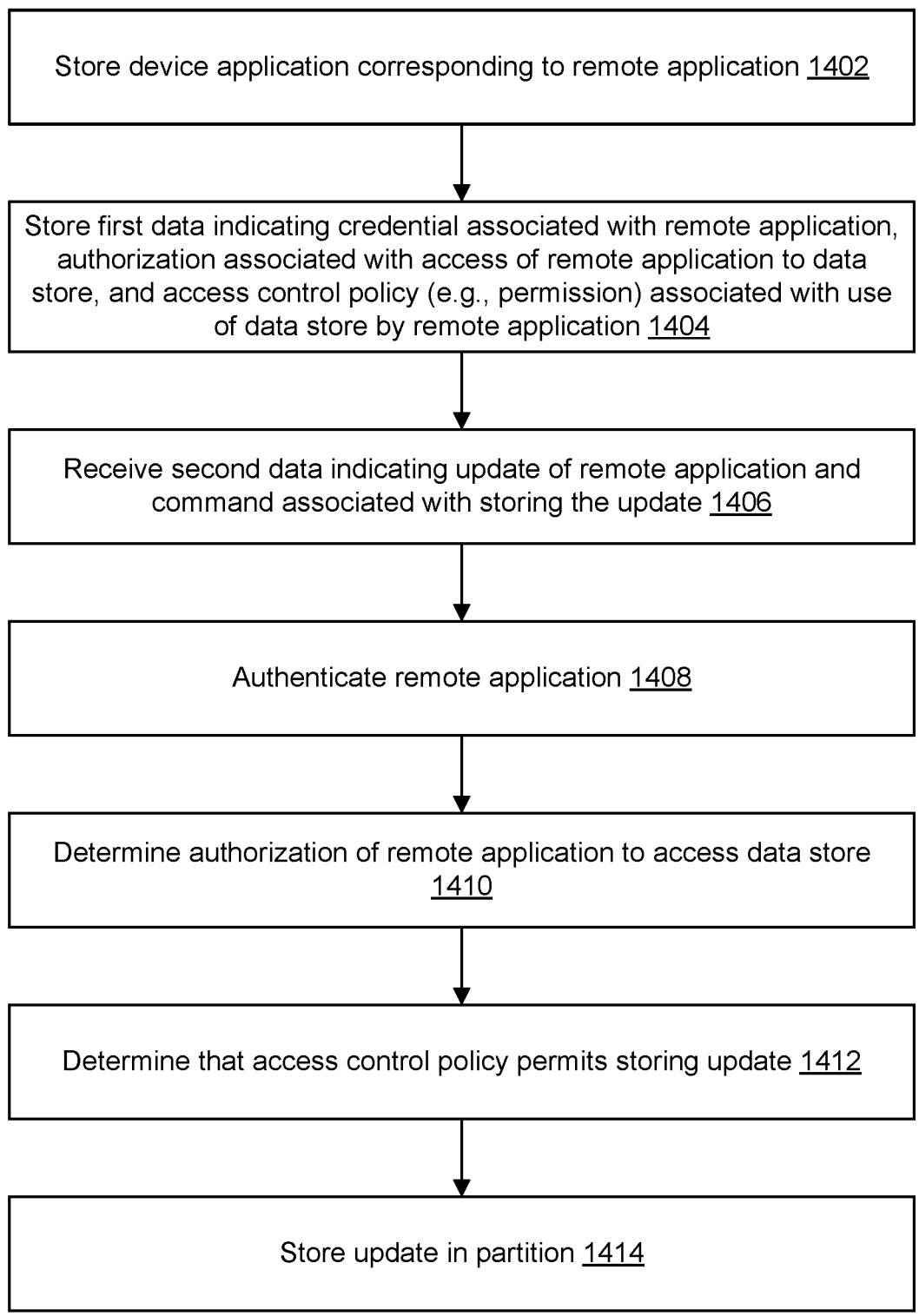
FIG. 14 illustrates an example of a flow for receiving an update, according to an embodiment of the present disclosure.

FIG. 14 illustrates an example of a flow for receiving an update pushed to the device, according to an embodiment of the present disclosure. As illustrated, the flow may start at operation 1402, where the device stores a device application corresponding to a remote application configured to be executed remotely from the device. For example, the device application can be downloaded from the computing component, from the server that executes the remote application, or from an application store.

At operation 1404, the device stores first data indicating a credential associated with the remote application, an authorization associated with access of the remote application to the data store, and an access control policy associated with use of the data store by the remote application. The credential can be stored along with a set of application credentials and and/or can be included in the access control policy itself. The authorization can be stored along with a set of application authorizations associated with accessing the data store. The credential, authorization, and access control policy can be received as part of a procedure to configure a partition within the data store for the remote application, such as by receiving a data store access configuration from the computing component.

At operation 1406, the device receives, from the computing component, second data indicating a credential, an update of the remote application, and a command associated with storing the update in the data store. The credential can be the same as the credential received at operation 1404. The update can correspond to a push of the remote application by being, for example, a data push and/or a software package push. The command can instruct the device to store the update in the partition, a namespace within the partition, and/or an entry within the namespace.

At operation 1408, the device authenticates the remote application based on the credential. For example, the credential can be compared to the set of application credentials. The comparison can indicate a match. The match can then indicate that the remote application is authenticated.

At operation 1410, the device can determine the authorization of the remote application to access the data store. For example, the matched credential is used to look up the set of access authorization to then determine the authorization corresponding to the matched credential. This authorization can permit the access of the remote application to the data store but may not be specific to access of the remote application to a particular partition.

At operation 1412, the device that the access control policy permits storing the update in the data store. For example, the command can indicate the partition. The access control policy corresponding to this partition is looked up to determine whether it includes the credential. If it does not include the credential, the update may not be stored in the partition. If it includes the credential, the access control policy can indicate whether access to a particular namespace and/or entry is permitted and/or if a particular type of update (or portions/fields thereof) can be stored. If not, the update may not be stored in the partition. Otherwise, the device determines that the update can bs stored.

At operation 1414, the device stores the update in the data store. Assuming that a permission is determined at operation 1412, the update is stored within the relevant namespace and/or entry of the partition.

Figure 15:
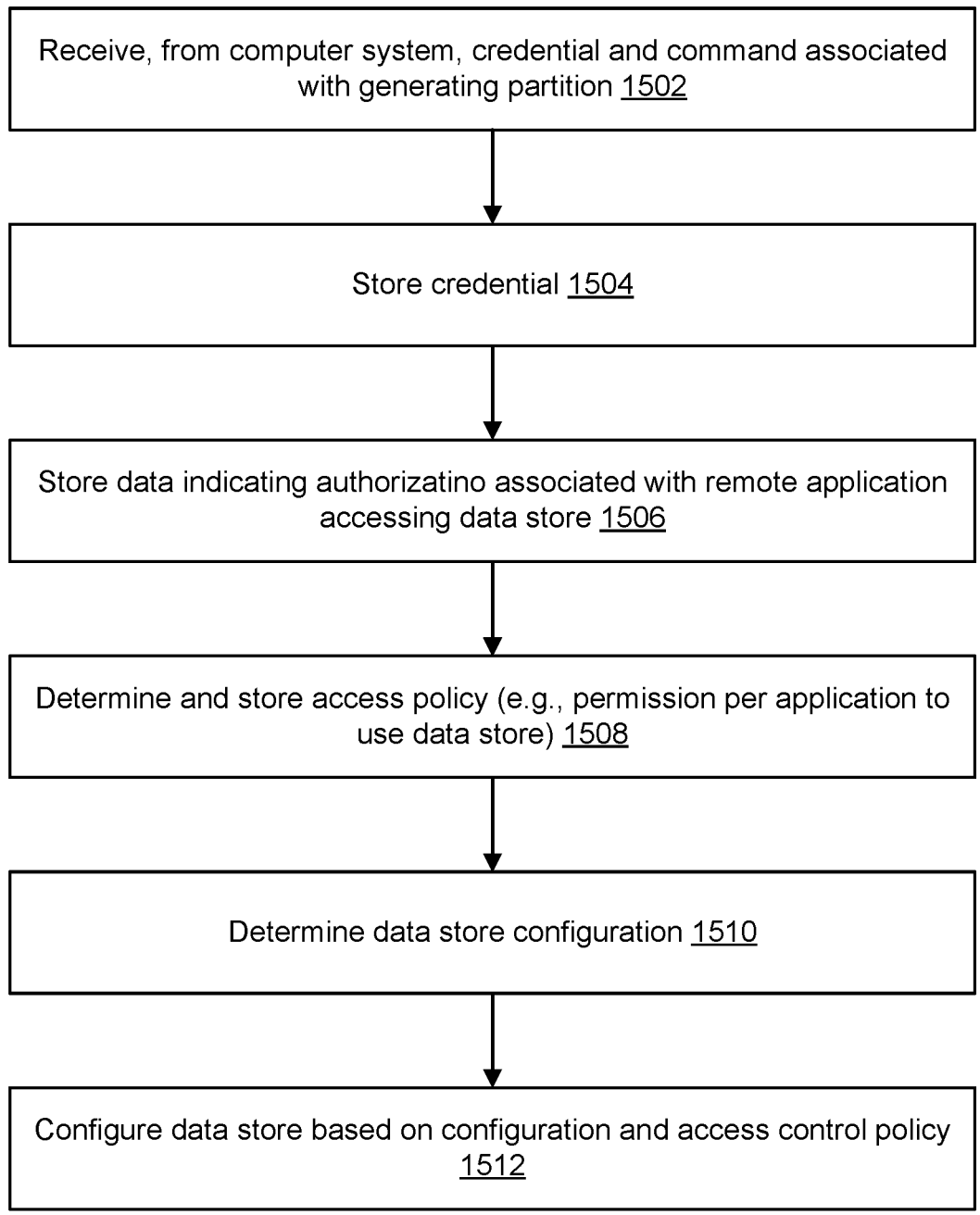
FIG. 15 illustrates an example of a flow for configuring a data store of a device, according to an embodiment of the present disclosure.

FIG. 15 illustrates an example of a flow for configuring a data store of a device, according to an embodiment of the present disclosure. Operations of the flow can be implemented as sub-operations of particular operations of the flow of FIG. 14.

As illustrated, the flow of FIG. 15 may start at operation 1502, where the device receives, from the computing component, a credential and a command associated with generating a partition. The credential and command can be similar to those described in connection with operation 1014 of FIG. 10 and can be received by the data store synchronization agent.

At operation 1504, the device stores the credential. For example, the data store synchronization agent makes an API call to an authentication and authorization component that then stores it in the data store along with a set of application credentials.

At operation 1506, the device sores data indicating an authorization associated with the remote application accessing the data store. For example, in response to the API call, the authentication and authorization component also generates and stores authorization data indicating a set of application authorizations and that the credential is usable to access the data store according to the set of application authorization.

At operation 1508, the device determines and stores an access policy. The access policy can represent permissions for using the data store, where each permission can be associated with an application and can indicate that application is permitted to use the data store and parameters related to the use (e.g., to write, read, edit, delete, or perform other manipulation operations). For example, the data store synchronization agent makes an API call to a data store access component in response to the command. This API call can indicate the permissions specified by an access control policy generated by the remote application and can include the credential of this application and, optionally, credentials of other applications (e.g., in the case of a shared access control policy) and permission related thereto. The data store access component can store such permissions and credential(s) as an access control policy in the data store and can associate an identifier of this policy with an identifier of a partition to be generated for the remote application.

At operation 1510, the device determines a data store configuration. For example, the API call also indicates the configuration of the partition to be generated, such as its identifier and storage size, number and identifier(s) of namespace(s) within the partition, and/or number and identifier(s) of entry(ies) within a namespace. The data store access component can determine such configuration data from the API call.

At operation 1512, the device configures the data store based on the configuration data and access control policy. For example, the partition is generated to have the indicated storage size and to include the namespace(s) and entry field(s) that may be identified according to the corresponding identifiers. The permissions of the access control policy can be associated with the different identifiers, as applicable.

Figure 16:
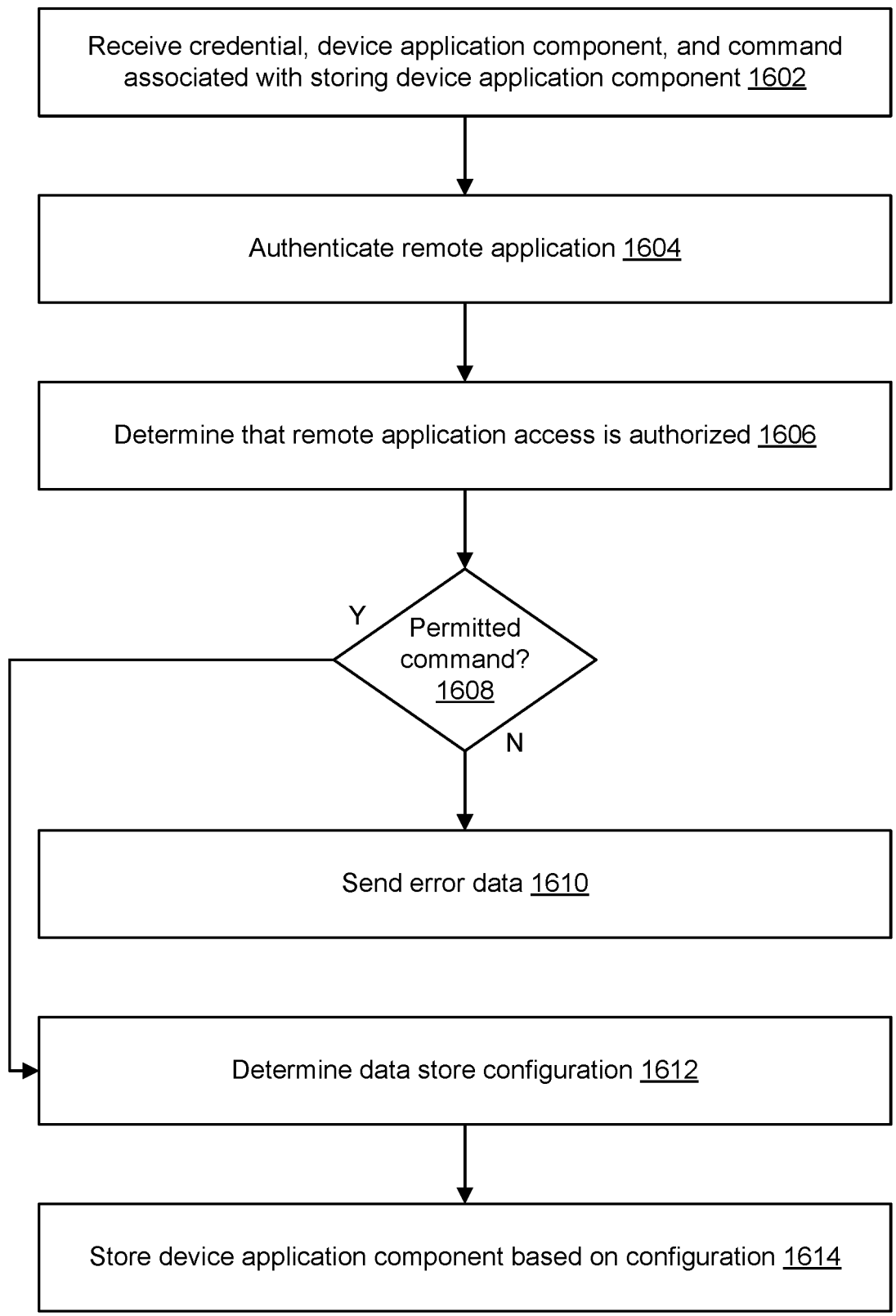
FIG. 16 illustrates an example of a flow for storing an update, according to an embodiment of the present disclosure.

FIG. 16 illustrates an example of a flow for storing an update to a device, according to an embodiment of the present disclosure. Operations of the flow can be implemented as sub-operations of particular operations of the flow of FIG. 14.

As illustrated, the flow of FIG. 16 may start at operation 1602, where the device receives, from the computing component, a credential, an update of a remote application, and a command associated with storing the update. This operation 1602 can be equivalent to operation 1112 of FIG. 11 and can be performed by the data store synchronization agent.

At operation 1604, the device authenticates the remote application. For example, the data store synchronization agent makes an API call to the authentication and authorization component, where this API call includes the credential. In turn, the authentication and authorization component determines a match between the credential and a stored set of application credentials and declares the authentication based on the match.

At operation 1606, the device determines that the remote application is authorized to access the data store. For example, the authentication and authorization component also determines a match between the credential and a stored set of application authorizations and determines that the matched application authorization indicates that the remote application is authorized to access the data store.

At operation 1608, the device determines whether the command is permitted. For example, the data store synchronization agent makes an API call to the data store access component, where this API call indicates the credential, the update, a storage location within the data store (e.g., a partition, a namespace within the partition, and/or an entry within the namespace). The data store access component looks up the access control policy associated with the storage location and determines whether the credential is associated with an access permission or not. If the access permission is determined, operation 1612 may follow operation 1608. Otherwise, no access permission exists and operation 1610 may follow operation 1608.

At operation 1610, the device sends error data to the computing component. For instance, the data access component sends an API response indicating that the update was not stored. In turn, the data store synchronization agent sends event data to the data store service component indicating the failure.

At operation 1612, the device determines the data store configuration that is applicable to store the update. For instance, this configuration is determined from the API call and indicates the partition, namespace, and/or entry.

At operation 1614, the device stores the update based on the data store configuration. For example, the update is stored in the partition and/or the namespace, whereby a key-pair is used in the entry.

Although the above flow is described in connection with storing an update, the flow can be similarly and equivalently applied to other types of operations. For instance, a delete operation can be performed, whereby a command of the computing component can instruct the device to delete a particular entry or namespace in a partition, and the device may receive and execute this command.

Figure 17:
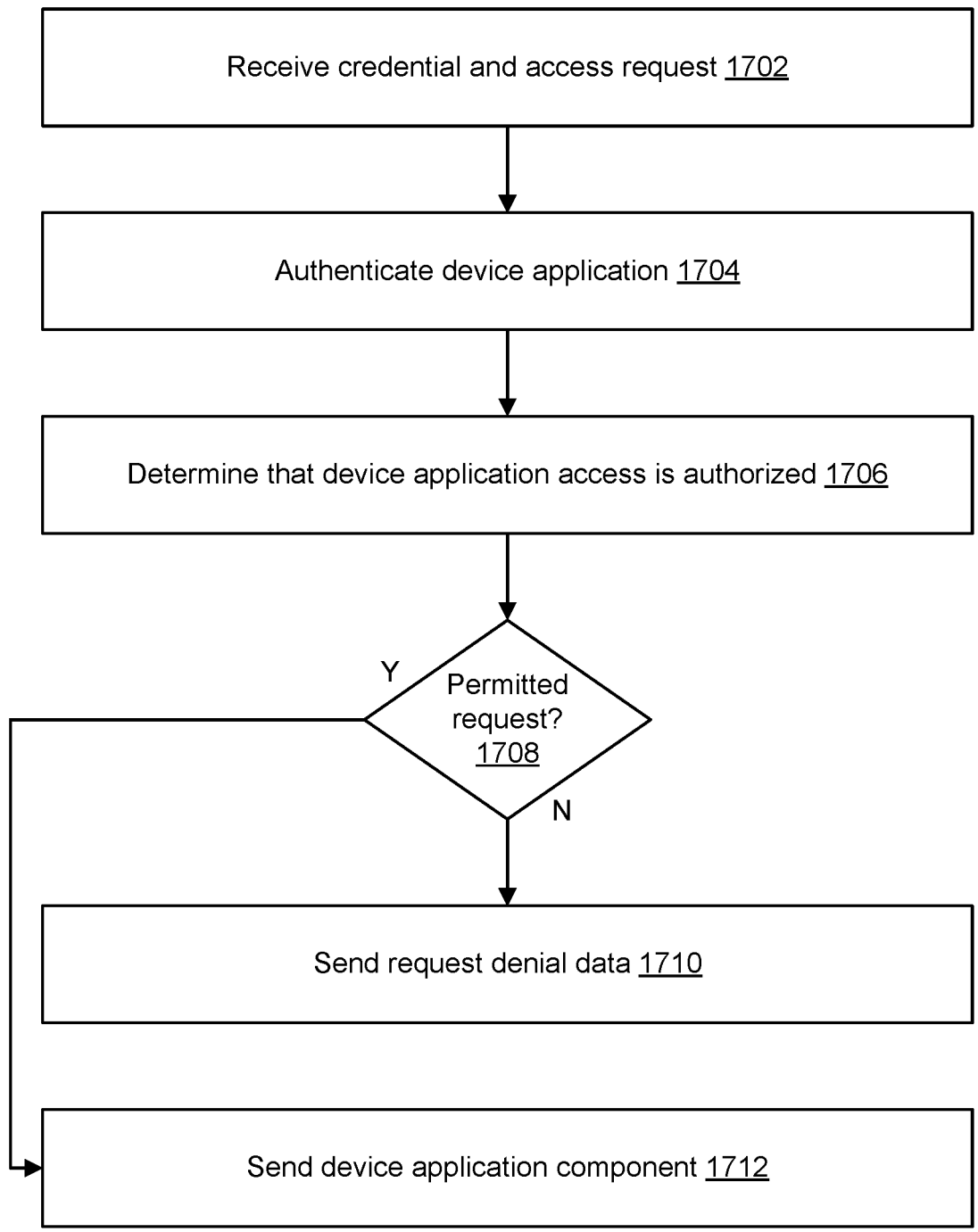
FIG. 17 illustrates an example of a flow for accessing a data store of a device, according to an embodiment of the present disclosure.

FIG. 17 illustrates an example of a flow for accessing a data store of a device, according to an embodiment of the present disclosure. Operations of the flow may be executed by component of the device such that a device application executing on the device can access an update already pushed to the device and stored in a partition of the data store.

As illustrated, the flow may start at operation 1702, where the data store application receives a credential and an access request to the partition. The credential can be received by the authentication and authorization component from the device application (or from a data store interface application) via an API call. The request can be received by the data store access component from the device application (or from the data store interface application) via an API call. The request can indicate a storage location to be accessed, such as partition, namespace, and/or entry to be accessed, by including the relevant identifier(s). In an example, the device application can include (e.g., in its APL document) the credential to use.

At operation 1704, the data store application authenticates the device application. This operation 1704 can be similar to operation 1604 of FIG. 16, where the authentication and authorization component performs the authentication by comparing the credential to the stored set of application authorizations.

At operation 1706, the data store application that device application's access to the data store is authorized. This operation 1706 can be similar to operation 1606 of FIG. 16, where the authentication and authorization component determines the authorization from the stored set of application authorizations.

At operation 1708, the data store application determines whether the access to the requested storage location. This operation 1708 can be similar to operation 1608 of FIG. 16, where the data store access component determines the permissions associated with the requested storage location and with the credential. If this access is authorized, operation 1712 may follow operation 1708. Otherwise, operation 1710 may follow operation 1708.

At operation 1710, the data store application sends request denial data to the device application (or to the data store interface application). For example, this data indicates that the requested storage location cannot be accessed and can be sent in an API response.

At operation 1712, the data store application sends an update stored at the requested storage location to the device application (or to the data store interface application). For example, the update can be sent in an API response.

Although the above flow is described in connection with storing an update, the flow can be similarly and equivalently applied to other types of operations. For instance, a manipulation operation (e.g., an edit) can be performed, whereby a command of the device application can instruct the data store application to manipulate a particular entry or namespace in a partition, and the data store application may receive and execute this command.

Figure 18:
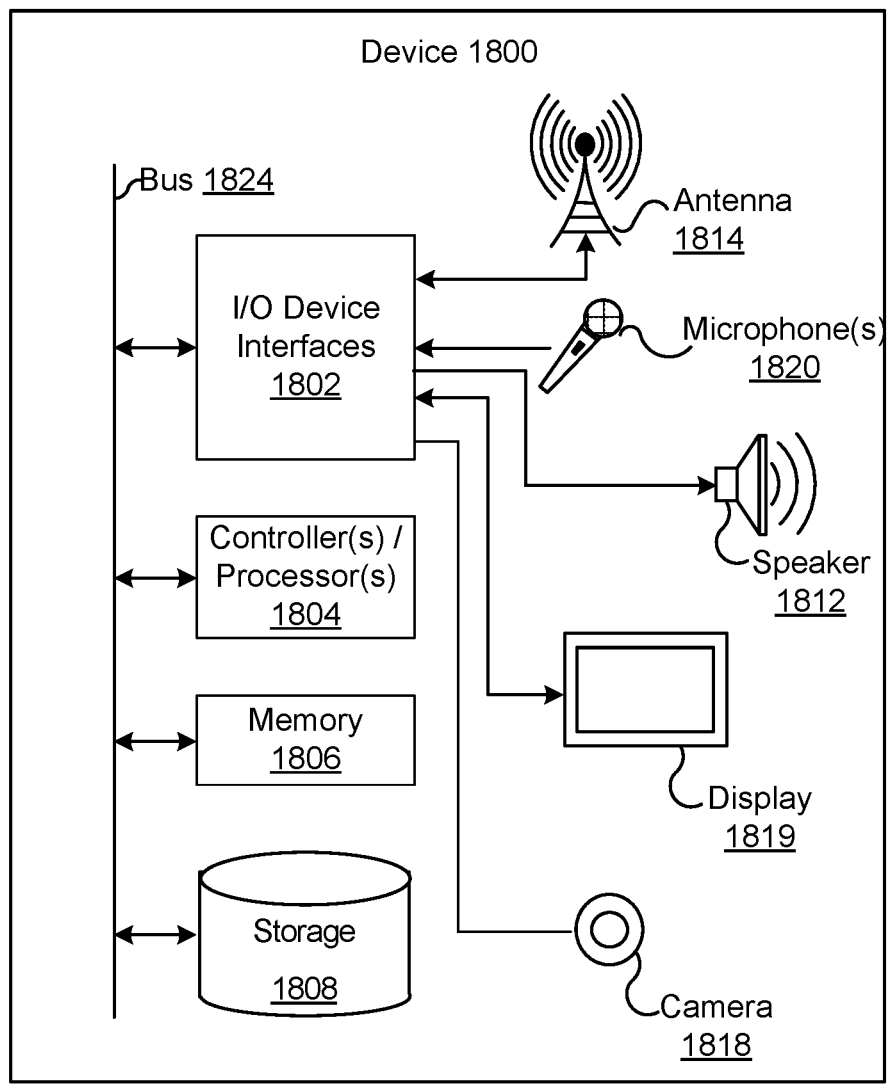
FIG. 18 illustrates an example of components of a device, in accordance with embodiments of the present disclosure.
Figure 19:
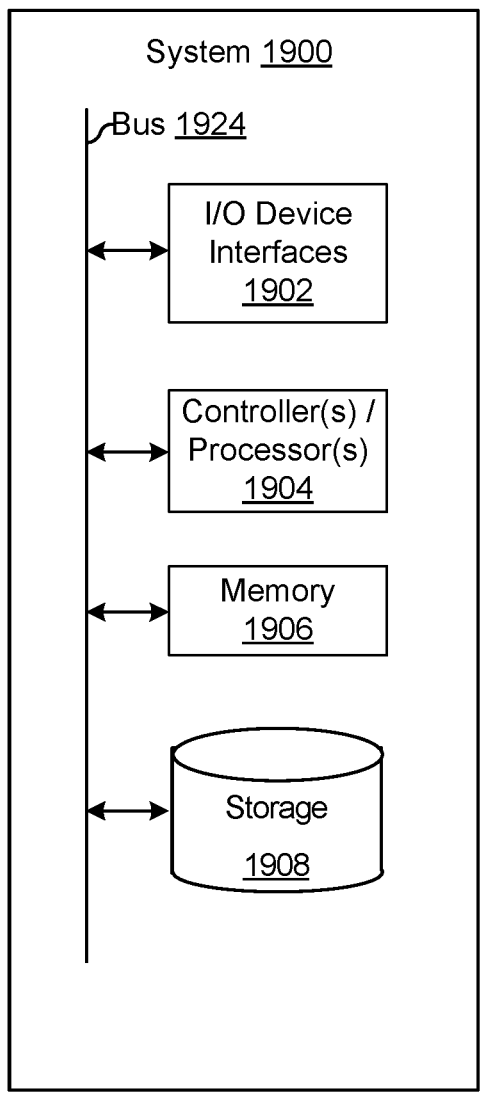
FIG. 19 illustrates an example of components of a computer system, in accordance with embodiments of the present disclosure.

FIG. 18 illustrates an example of components of a device 1800 (e.g., an example of the devices described herein above), in accordance with embodiments of the present disclosure. FIG. 19 illustrates an example of components of a computer system 1900 (e.g., one that can include any of the computing components described herein above), in accordance with embodiments of the present disclosure. The computer system 1900 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems may be included in the computer system 1900 of the present disclosure, such as one or more NLP systems for performing ASR processing, one or more NLP systems for performing NLU processing, etc. In operation, each of these systems may include computer-readable and computer-executable instructions that reside on the computer system 1900.

Each of the device 1800 and the computer system 1900 may include one or more controllers/processors (1804/1904), which may each include a central processing unit (CPU) for processing data and computer-readable instructions, and a memory (1806/1906) for storing data and instructions of the respective device. The memories (1806/1906) may individually include volatile random-access memory (RAM), non-volatile read-only memory (ROM), non-volatile magneto-resistive memory (MRAM), and/or other types of memory. Each of the device 1800 and the computer system 1900 may also include a data storage component (1808/1908) for storing data and controller/processor-executable instructions. Each data storage component (1808/1908) may individually include one or more non-volatile storage types, such as magnetic storage, optical storage, solid-state storage, etc. The data storage component 1808 of the device 1800 may also include a data store as described herein above. Each of the device 1800 and the computer system 1900 may also be connected to removable or external non-volatile memory and/or storage (such as a removable memory card, memory key drive, networked storage, etc.) through respective input/output device interfaces (1802/1902).

Computer instructions for operating each of the device 1800 and the computer system 1900 and its various components may be executed by the respective controller(s)/processor(s) (1804/1904), using the memory (1806/1906) as temporary "working" storage at runtime. Computer instructions may be stored in a non-transitory manner in non-volatile memory (1806/1906), storage (1808/1908), or an external device(s). Alternatively, some or all of the executable instructions may be embedded in hardware or firmware on the respective device in addition to or instead of software.

Each of the device 1800 and the computer system 1900 may include input/output device interfaces (1802/1902). A variety of components may be connected through the input/output device interfaces (1802/1902). Additionally, each of the device 1800 and the computer system 1900 may include an address/data bus (1824/1924) for conveying data among components of the respective device. Each component within the device 1800 may also be directly connected to other components in addition to (or instead of) being connected to other components across the bus (1824/1924).

Referring to FIG. 18, the device 1800 may include input/output device interfaces 1802 that connect to a variety of components, such as an audio output component such as a speaker 1812, a wired headset or a wireless headset (not illustrated), or other component capable of outputting audio. The device 1800 may also include an audio capture component. The audio capture component may be, for example, a microphone 1820 or array of microphones, a wired headset, or a wireless headset (not illustrated), etc. If an array of microphones is included, approximate distance to a sound's point of origin may be determined by acoustic localization based on time and amplitude differences between sounds captured by different microphones of the array. The device 1800 may additionally include a display 1816 for displaying content. The device 1800 may further include a camera 1818.

Via antenna(s) 1814, the input/output device interfaces 1802 may connect to one or more networks 199 via a wireless local area network (WLAN) (such as WiFi) radio, Bluetooth, and/or wireless network radio, such as a radio capable of communication with a wireless communication network, such as a Long Term Evolution (LTE) network, WiMAX network, 4G network, 5G network, etc. A wired connection, such as Ethernet, may also be supported. Through network(s), the system may be distributed across a networked environment. The I/O device interface (1802/1902) may also include communication components that allow data to be exchanged between devices, such as different physical servers in a collection of servers or other components.

The components of each of the device 1800 and the computer system 1900 may include their own dedicated processors, memory, and/or storage. Alternatively, one or more of the components of the device 1800 and the computer system 1900 may utilize the I/O interfaces (1802/1902), processor(s) (1804/1904), memory (1806/1906), and/or storage (1808/1908) of of the device 1800 and the computer system 1900, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 1800 and the computer system 1900, as described herein, are illustrative, and may be located as a stand-alone device or may be included, in whole or in part, as a component of a larger device or system.

FIG. 20 is a conceptual diagram illustrating components that may be included in a device 2010, in accordance with embodiments of the present disclosure. The device 2010 may be an example of the devices described herein above. the device 2010 may include a wake word detection component 2020 configured to compare the audio data 2011 to stored models used to detect a wake word (e.g., "Alexa") that indicates to the device 2010 that audio data 2011 corresponding to audio 2007 detected by a set of microphones of the device 2010 is to be processed for determining NLU output data (e.g., slot data that corresponds to a named entity, label data, and/or intent data, etc.). In at least some embodiments, a hybrid selector 2024, of the device 2010, may send the audio data 2011 to the wake word detection component 2020. If the wake word detection component 2020 detects a wake word in the audio data 2011, the wake word detection component 2020 may send an indication of such detection to the hybrid selector 2024. In response to receiving the indication, the hybrid selector 2024 may send the audio data 2011 to the system component(s) 2021 and/or the ASR component 2050. The wake word detection component 2020 may also send an indication, to the hybrid selector 2024, representing a wake word was not detected. In response to receiving such an indication, the hybrid selector 2024 may refrain from sending the audio data 2011 to system component(s) 2021, and may prevent the ASR component 2050 from further processing the audio data 2011. In this situation, the audio data 2011 can be discarded.

The device 2010 may conduct its own speech processing using on-device language processing components, such as an SLU/language processing component 2092 (which may include an ASR component 2050 and an NLU 2060), similar to the manner discussed herein with respect to the SLU component (or ASR component and the NLU component) of the system component(s) 2021. The device 2010 may also internally include, or otherwise have access to, other components such as one or more skill components 2090 capable of executing commands based on NLU output data or other results determined by the device 2010/system component(s) 2021, a user recognition component 2095, profile storage 2070, or other components. In at least some embodiments, the profile storage 2070 may only store profile data for a user or group of users specifically associated with the device 2010. A skill component 2090 may communicate with a skill system(s) 2025. The device 2010 may also have its own language output component 2093 which may include NLG component 2079 and TTS component 2080. The system component(s) 2021 may include a language output component that operates similar to the language output component 2093, including the NLG component 2079 and a TTS component 2080.

The NLG component 2079 can generate text for purposes of TTS output to a user. For example, the NLG component 2079 may generate text corresponding to instructions corresponding to a particular action for the user to perform. The NLG component 2079 may generate appropriate text for various outputs as described herein. The NLG component 2079 may include one or more trained models configured to output text appropriate for a particular input. The text output by the NLG component 2079 may become input for the TTS component. Alternatively or in addition, the TTS component may receive text data from a skill or other system component for output.

The NLG component 2079 may include a trained model. The NLG component 2079 generates text data such that the output text data has a natural feel and, in some embodiments, includes words and/or phrases specifically formatted for a requesting individual. The NLG component 2079 may use templates to formulate responses. The NLG component 2079 may include models trained from the various templates for forming the output text data. For example, the NLG component 2079 may analyze transcripts of local news programs, television shows, sporting events, or any other media program to obtain common components of a relevant language and/or region. As one illustrative example, the NLG component 2079 may analyze a transcription of a regional sports program to determine commonly used words or phrases for describing scores or other sporting news for a particular region. The NLG component 2079 may further receive, as inputs, a dialog history, an indicator of a level of formality, and/or a command history or other user history such as the dialog history.

The NLG component 2079 may generate dialog data based on one or more response templates. For example, and referring back to the weather application 117 of FIG. 1, the NLG component 2079 may select a template in response to the question, "What is the weather currently like?" of the form: "The weather currently is $weather_information$." The data for "$weather_information$" can be proactively pre-stored in a partition within a data store, such as the partition 113 of FIG. 1A according to the embodiments described herein above. The NLG component 2079 may analyze the logical form of the template to produce one or more textual responses including markups and annotations to familiarize the response that is generated. In some embodiments, the NLG component 2079 may determine which response is the most appropriate response to be selected. The selection may, therefore, be based on past responses, past questions, a level of formality, and/or any other feature, or any other combination thereof. Responsive audio data representing the response generated by the NLG component 2079 may then be generated using the text-to-speech component 2080.

In at least some embodiments, the on-device language processing components may not have the same capabilities as the language processing components of the system component(s) 2021. For example, the on-device language processing components may be configured to handle only a subset of the natural language user inputs that may be handled by the system component(s) 2021. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 2021. If the device 2010 attempts to process a natural language user input for which the on-device language processing components are not necessarily best suited, the language processing results determined by the device 2010 may indicate a low confidence or other metric indicating that the processing by the device 2010 may not be as accurate as the processing done by the system component(s) 2021.

The hybrid selector 2024, of the device 2010, may include a hybrid proxy (HP) 2026 configured to proxy traffic to/from the system component(s) 2021. For example, the HP 2026 may be configured to send messages to/from a hybrid execution controller (HEC) 2027 of the hybrid selector 2024. For example, command/directive data received from the system component(s) 2021 can be sent to the HEC 2027 using the HP 2026. The HP 2026 may also be configured to allow the audio data 2011 to pass to the system component(s) 2021 while also receiving (e.g., intercepting) this audio data 2011 and sending the audio data 2011 to the HEC 2027.

In at least some embodiments, the hybrid selector 2024 may further include a local request orchestrator (LRO) 2028 configured to notify the ASR component 2050 about the availability of new audio data 2011 that represents user speech, and to otherwise initiate the operations of local language processing when new audio data 2011 becomes available. In general, the hybrid selector 2024 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 2010 receives directive data from the system component(s) 2021 and chooses to use that remotely determined directive data.

Thus, when the audio data 2011 is received, the HP 2026 may allow the audio data 2011 to pass through to the system component(s) 2021 and the HP 2026 may also input the audio data 2011 to the on-device ASR component 2050 by routing the audio data 2011 through the HEC 2027 of the hybrid selector 2024, whereby the LRO 2028 notifies the ASR component 2050 of the audio data 2011. At this point, the hybrid selector 2024 may wait for response data from either or both of the system component(s) 2021 or the local language processing components. However, the disclosure is not limited thereto, and in some examples the hybrid selector 2024 may send the audio data 2011 only to the local ASR component 2050 without departing from the disclosure. For example, the device 2010 may process the audio data 2011 locally without sending the audio data 2011 to the system component(s) 2021.

The local ASR component 2050 is configured to receive the audio data 2011 from the hybrid selector 2024, and to recognize speech in the audio data 2011, and the local NLU component 2060 is configured to determine a user intent from the recognized speech, and to determine how to act on the user intent by generating NLU output data which may include directive data (e.g., data for a command that instructs a component to perform an action). Such NLU output data may take a form similar to that as determined by the NLU component of the system component(s) 2021. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s). In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 2060) may be selected as usable to respond to a natural language user input, and local response data may be sent (e.g., local NLU output data, local knowledge base information, internet search results, and/or local directive data) to the hybrid selector 2024, such as a "ReadyToExecute" response. The hybrid selector 2024 may then determine whether to use directive data from the on-device components to respond to the natural language user input, to use directive data received from the system component(s) 2021, assuming a remote response is even received (e.g., when the device 2010 is able to access the system component(s) 2021 over the network(s)), or to determine output audio requesting additional information from the user.

The device 2010 and/or the system component(s) 2021 may associate a unique identifier with each natural language user input. The device 2010 may include the unique identifier when sending the audio data 2011 to the system component(s) 2021, and the response data from the system component(s) 2021 may include the unique identifier to identify which natural language user input the response data corresponds.

In at least some embodiments, the device 2010 may include, or be configured to use, one or more skill components 2090 that may work similarly to the skill component(s) implemented by the system component(s) 2021. The skill component(s) 2090 may correspond to one or more domains that are used in order to determine how to act on a spoken input in a particular way, such as by outputting a directive that corresponds to the determined intent, and which can be processed to implement the desired operation. The skill component(s) 2090 installed on the device 2010 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to an intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like. In an example, a skill component 2090 installed on the device 2010 can include a device application, such as the weather application 117 or the smart home application 119 of FIG. 1A, a device application 114 FIG. 1B, any of device applications 230A-230K of FIG. 2, any of device applications 330A-330K of FIG. 3, any of device applications 430A-430K of FIG. 4, any of device applications 530A-530K of FIG. 5, or device application 729 of FIG. 7.

Additionally or alternatively, the device 2010 may be in communication with one or more skill systems 2025. For example, a skill system 2025 may be located in a remote environment (e.g., separate location) such that the device 2010 may only communicate with the skill system 2025 via the network(s) However, the disclosure is not limited thereto. For example, in at least some embodiments, a skill system 2025 may be configured in a local environment (e.g., home server and/or the like) such that the device 2010 may communicate with the skill system 2025 via a private network, such as a local area network (LAN). In an example, a skill component of a skill system 2025 can include a remote application, such as the remote application 130 of FIGS. 1A and 1B, any of the remote applications described in FIGS. 2-6, any of remote applications 740A-740K of FIG. 7, or the remote application 830 of FIG. 8.

As used herein, a "skill" may refer to a skill component 2090, a skill system 2025, or a combination of a skill component 2090 and a corresponding skill system 2025.

The device 2010 may be configured to recognize multiple different wake words and/or perform different categories of tasks depending on the wake word. Such different wake words may invoke different processing components of local device 2010 (not illustrated in FIG. 20). For example, detection of the wake word "Alexa" by the wake word detector 2020 may result in sending audio data to certain language processing components 2092/skills 2090 for processing while detection of the wake word "Computer" by the wake word detector 2020 may result in sending audio data different language processing components 2092/skills 2090 for processing.

One or more of the herein described system(s) 2021 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture, such as a memory device or non-transitory computer-readable storage medium. The computer-readable storage medium may be readable by a computer and may comprise instructions for causing a computer or other device to perform processes described in the present disclosure. The computer-readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language, such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A device comprising:
   one or more processors; and
   one or more memory storing instructions that, upon execution by the one or more processors, configure the device to:
   cause, by a first application executing on the device and controlling use of a data store of the device by a plurality of applications, first data to be stored in the data store, the first data permitting use of the data store by the plurality of applications;
   receive, from a computing component, second data of a second application executing remotely from the device, a command to store the second data in the data store, and a credential associated with the second application;

determine, by the first application, that the first data indicates that the credential is associated with a first permission to store the first data in a partition, the partition being a storage region that is configured within the data store for the second application;

cause, by the first application, the second data to be stored in the partition;

receive, by the first application, a first data read request of a third application executing on the device, the first data read request identifying the partition;

determine, by the first application, that the first data indicates that the third application is associated with a second permission to access the partition; and send, by the first application, the second data to the third application.

2. The device of claim 1, wherein the one or more memory store further instructions that, upon execution by the one or more processors, configure the device to:

receive, by the first application, a second data read request of a fourth application executing on the device, the second data read request identifying the partition;

determine, by the first application, that the first data indicates that the fourth application is associated with a third permission to access the partition; and send, by the first application, the second data to the fourth application, wherein the fourth application is configured to provide a first graphical user interface (GUI) that presents the second data, and wherein the third application is configured to provide a second GUI that presents the second data and third data from another partition within the data store.

3. The device of claim 1, wherein the one or more memory store further instructions that, upon execution by the one or more processors, configure the device to:

receive, prior to receiving the second data, third data of the second application, the third data indicating a request to generate the partition according to an identifier, the third data further indicating that the third application is permitted to access the partition; and generate the partition by at least associating the storage region within the data store with the identifier, the first permission, and the second permission.

4. A method implemented by a first application of a device, the method comprising:

causing first data to be stored in a data store of the device, the data store including a plurality of partitions, the first data permitting use of a partition of the plurality of partitions by a plurality of applications that include a second application executing remotely from the device, a third application executing on the device, and a fourth application executing on the device;

receiving second data from the second application;

causing, based at least in part on the first data, the second data to be stored in the partition;

receiving, from the third application, a first read request indicating the partition;

determining that the third application is permitted to access the partition based at least in part on the first data; and sending, based at least in part on the first data, the second data to the third application.

5. The method of claim 4 further comprising:

receiving, from the fourth application, a second read request indicating the partition, wherein the second data is received prior to the first read request and prior to the second read request;

determining that the first data indicates that the fourth application is permitted to access the partition; and sending the second data to the fourth application.

6. The method of claim 4 further comprising:

receiving, from the fourth application, a second read request indicating a different partition;

determining that the first data indicates that the fourth application is prohibited from accessing the different partition; and sending an indication to the fourth application that the second read request is denied.

7. The method of claim 4, wherein the first read request is received based least in part on a determination of the third application that the second data is stored in the partition, wherein the determination is based at least in part on a template of the third application.

8. The method of claim 7 further comprising:

determining, based at least in part on the first read request, an identifier of the partition, a namespace within the partition, and an entry within the namespace, wherein the template indicates the identifier, the namespace, and the entry; and reading the second data from the entry.

9. The method of claim 7 further comprising receiving, from a computing component remote from the device, the template prior to receiving the first read request; and causing the template to be stored in the device.

10. The method of claim 4 further comprising:

sending, to a computing component remote from the device, third data indicating that the data store is enabled on the device;

receiving, from the computing component based at least in part on the third data, fourth data of the second application, the fourth data indicating a request to generate the partition; and generating the partition based at least in part on the fourth data.

11. The method of claim 10 further comprising:

determining that the third data indicates a first permission of the second application and a second permission of the third application to access the partition;

generating the first data indicating the first permission and the second permission; and causing the first data to be stored in the partition.

12. The method of claim 10 further comprising:

determining that the third data indicates a first permission of the second application and a second permission of the third application to access the partition;

generating the first data indicating the first permission and the second permission;

determining that the second data is to be stored in the partition based at least in part on the first permission; and determining that the second data is to be read from the partition based at least in part on the second permission.

13. A device comprising:

one or more processors; and one or more memory storing instructions that, upon execution by the one or more processors, configure the device to:

cause, by a first application of the device and controlling use of a data store of the device by a plurality of applications, first data to be stored in the data store, the data store including a plurality of partitions, the first data permitting use of a partition of the plurality of partitions by the plurality of applications that include a second application executing remotely from the device, a third application executing on the device, and a fourth application executing on the device;

receive second data from the second application;

cause, by the first application, the second data to be stored in the partition within the data store;

receive, by the first application, a read request of the third application to read the second data;

determine, by the first application, a permission of the third application to access the partition based at least in part on the first data; and send, by the first application, the second data to the third application.

14. The device of claim 13, wherein the one or more memory store further instructions that, upon execution by the one or more processors, configure the device to:

send, to a computing component remote from the device, third data indicating that the data store is inaccessible;

determine that the data store has become accessible; and send, to the computing component, fourth data indicating that the data store is accessible, wherein the second data is stored by the computing component prior to the fourth data being sent and is received after the fourth data is sent.

15. The device of claim 13, wherein the partition is a first partition, and wherein the one or more memory store further instructions that, upon execution by the one or more processors, configure the device to:

receive third data from the second application, the third data indicating a first request to generate the first partition;

generate the first partition based at least in part on the third data;

receive fourth data from a fifth application executing remotely from the device, the fourth data indicating a second request to generate a second partition; and generate the second partition within the data store based at least in part on the fourth data.

16. The device of claim 15, wherein the one or more memory store additional instructions that, upon execution by the one or more processors, configure the device to:

associate the first partition with a first permission of the second application and a second permission of the third application to access the first partition; and associate the second partition with a third permission of the fifth application to access the second partition.

17. The device of claim 15, wherein the one or more memory store additional instructions that, upon execution by the one or more processors, configure the device to:

determine that the fourth data indicates a permission of the fourth application executing on the device to access the second partition; and generate fifth data that indicates the permission, wherein the third application is denied access to the second partition based at least in part on the fifth data.

18. The device of claim 13, wherein the one or more memory store further instructions that, upon execution by the one or more processors, configure the device to:

receive third data from the second application, the third data indicating a permission of the third application to read and delete the second data;

generate the first data indicating the permission; and associate the partition with the first data.

19. The device of claim 18, wherein the one or more memory store additional instructions that, upon execution by the one or more processors, configure the device to:

receive, from the third application, fourth data indicating a request to delete the second data; and cause, based at least in part on the permission, the second data to be deleted from the partition.

20. The device of claim 13, wherein the one or more memory store further instructions that, upon execution by the one or more processors, configure the device to:

generate audio data corresponding to audio detected by a set of microphones of the device;

determine, based at least in part on speech processing applied to the audio data, that an output is to be presented by the third application; and present, by the third application, the output based at least in part on the second data, wherein the second data is received from the second application prior to the audio being detected.

* * * * *